United States Patent
Matsumoto

(10) Patent No.: US 7,825,924 B2
(45) Date of Patent: Nov. 2, 2010

(54) IMAGE PROCESSING METHOD AND COMPUTER READABLE MEDIUM FOR IMAGE PROCESSING

(75) Inventor: Kazuhiko Matsumoto, Tokyo (JP)

(73) Assignee: Ziosoft, Inc., Tokyo (JP)

( * ) Notice: Subject to any disclaimer, the term of this patent is extended or adjusted under 35 U.S.C. 154(b) by 630 days.

(21) Appl. No.: 11/561,905

(22) Filed: Nov. 21, 2006

(65) Prior Publication Data

US 2007/0120845 A1 May 31, 2007

(30) Foreign Application Priority Data

Nov. 25, 2005 (JP) ............................ P.2005-340949

(51) Int. Cl.
| | |
|---|---|
| G06T 15/00 | (2006.01) |
| G06T 17/00 | (2006.01) |
| G06T 17/20 | (2006.01) |
| G06T 15/50 | (2006.01) |
| G06T 15/60 | (2006.01) |
| G06K 9/00 | (2006.01) |
| G06K 9/20 | (2006.01) |

(52) U.S. Cl. .................. 345/419; 345/420; 345/423; 345/426; 382/131; 382/132

(58) Field of Classification Search .................. 345/419, 345/420, 423, 426; 382/128, 130–132
See application file for complete search history.

(56) References Cited

U.S. PATENT DOCUMENTS

| | | | | |
|---|---|---|---|---|
| 4,674,046 A | * | 6/1987 | Ozeki et al. ................. | 382/131 |
| 4,920,573 A | * | 4/1990 | Rhodes et al. ............... | 382/131 |
| 5,226,113 A | * | 7/1993 | Cline et al. .................. | 345/424 |
| 5,699,799 A | * | 12/1997 | Xu et al. ...................... | 600/407 |
| 5,891,030 A | * | 4/1999 | Johnson et al. ............. | 600/407 |
| 5,920,319 A | * | 7/1999 | Vining et al. ................ | 345/420 |
| 6,201,543 B1 | * | 3/2001 | O'Donnell et al. .......... | 345/420 |
| 6,212,420 B1 | | 4/2001 | Wang et al. | |
| 6,331,116 B1 | * | 12/2001 | Kaufman et al. ............ | 434/262 |
| 6,343,936 B1 | * | 2/2002 | Kaufman et al. ............ | 434/262 |
| 6,643,533 B2 | * | 11/2003 | Knoplioch et al. .......... | 600/407 |
| 6,674,430 B1 | * | 1/2004 | Kaufman et al. ............ | 345/419 |
| 6,753,878 B1 | * | 6/2004 | Heirich et al. ............... | 345/629 |

(Continued)

OTHER PUBLICATIONS

Hernandez-Hoyos et al., "Computer-assisted Analysis of Three-dimensional MR Angiograms", Radiographics, vol. 22, Issue 2, Nov. 2002, pp. 421-436.*

(Continued)

*Primary Examiner*—Ulka Chauhan
*Assistant Examiner*—Roberta Prendergast
(74) *Attorney, Agent, or Firm*—Pearne & Gordon LLP

(57) ABSTRACT

Disks having the maximum radius of a large intestine are created and the contours of the disks are connected by virtual springs. Next, the directions of the disks are adjusted so that virtual spring energy becomes the minimum, so that the adjacent disks are prevented from crossing each other. Virtual rays are projected along the disks for generating an image of inside the large intestine. Accordingly, quivering of the virtual rays along a central path lessens and effect of the scale on the image along the central path can be prevented and in the portion where the central path largely bends, duplicate display of the same observation object can also be prevented.

11 Claims, 35 Drawing Sheets

U.S. PATENT DOCUMENTS

| | | | |
|---|---|---|---|
| 6,842,638 B1 * | 1/2005 | Suri et al. | 600/425 |
| 2001/0055016 A1 * | 12/2001 | Krishnan | 345/424 |
| 2002/0118869 A1 * | 8/2002 | Knoplioch et al. | 382/131 |
| 2002/0136440 A1 * | 9/2002 | Yim et al. | 382/131 |
| 2003/0223627 A1 * | 12/2003 | Yoshida et al. | 382/128 |
| 2004/0064029 A1 * | 4/2004 | Summers et al. | 600/407 |
| 2006/0098007 A1 * | 5/2006 | Rouet et al. | 345/419 |
| 2007/0003131 A1 * | 1/2007 | Kaufman | 382/154 |
| 2007/0274579 A1 * | 11/2007 | Cai et al. | 382/131 |

OTHER PUBLICATIONS

Choi, et al., "A scalable force propagation approach for web-based deformable simulation of soft tissues", Proceedings of the Seventh international Conference on 3D Web Technology, Feb. 24-28, 2002, Web3D '02. ACM, NY, NY, pp. 185-193.*

Dachille, F. and Kaufman, A., "GI-cube: an architecture for volumetric global illumination and rendering", Proceedings of the ACM Siggraph/Eurographics Workshop on Graphics Hardware, Aug. 21-22, 2000, S. N. Spencer, Ed., HWWS '00, ACM, NY, NY, pp. 119-128.*

F. Dachille, H.Qin, and A. Kaufman, "A Novel Haptics-Based Interface and Sculpting System for Physics-Based Geometric Design", Computer Aided Design, Nov. 2001, pp. 1-41, http://www.cs.sunysb.edu/~vislab/papers/ix01novel.pdf.*

Dachille, Frank Clare, IX, Ph.D., "Algorithms and architectures for realistic volume imaging", State University of New York at Stony Brook, 2002, 221 pages.*

Hernandez-Hoyos et al., "A Deformable Vessel Model with Single Point Initialization for Segmentation", Quantification and Visualization of Blood Vessels in 3D MRA. Medical Image Computer and Computer Assisted Invention. Oct. 2000. pp. 735-745.*

Myoung-Hee Kim et al., "Cardiac-Station: Visual and Quantitative Analysis of Ventricular MRI images", The Fifth Korea-Germany Joint workshop on Advanced Medical Image Processing, May 2001, pp. 1-8.*

Montagnat, J.; Delingette, H., "A hybrid framework for surface registration and deformable models," Proceedings 1997 IEEE Computer Society Conference on Computer Vision and Pattern Recognition, 1997, pp. 1041-1046, Jun. 17-19, 1997.*

Pfister, H. and Kaufman, A.,1996, "Cube-4—a scalable architecture for real-time volume rendering", Proceedings of the 1996 Symposium on Volume Visualization, Oct. 28-29, 1996, Symposium on Volume Visualization, IEEE Press, Piscataway, NJ, pp. 47-ff.*

Guillaume Picinbono, Hervé Delingette, Nicholas Ayache, "Non-linear and Anisotropic Elastic Soft Tissue Models for Medical Simulation", ICRA 2001, May 2001, pp. 1370-1375.*

Rashev, et al., "Application of an object-oriented programming paradigm in three-dimensional computer modeling of mechanically active gastrointestinal tissues," IEEE Transactions on Information Technology in Biomedicine, vol. 4, No. 3, pp. 247-258, Sep. 2000.*

Tamez-Pena, J.G.; Parker, K.J.; Totterman, S., "The integration of automatic segmentation and motion tracking for 4D reconstruction and visualization of musculoskeletal structures," Proceedings Workshop on Biomedical Image Analysis, 1998., pp. 154-163, Jun. 26-27, 1998.*

Williams, et al., "Rational discrete generalized cylinders and their application to shape recovery in medical images," Proceedings 1997 IEEE Computer Society Conference on Computer Vision and Pattern Recognition, pp. 387-392, Jun. 17-19, 1997.*

Yim et al., "Vessel Surface Reconstruction With a Tubular Deformable Model", IEEE Transactions on Medical Imaging, vol. 20, Dec. 2001, pp. 1411-1421.*

Zerroug, M.; Nevatia, R., "Segmentation and 3-D recovery of curved-axis generalized cylinders from an intensity image," Proceedings of the 12th IAPR International Conference on Pattern Recognition, 1994. vol. 1—Conference A: Computer Vision & Image Processing., pp. 678-681 vol. 1, Oct. 9-13, 1994.*

Zerroug, M.; Nevatia, R., "Three-dimensional descriptions based on the analysis of the invariant and quasi-invariant properties of some curved-axis generalized cylinders," IEEE Transactions on Pattern Analysis and Machine Intelligence, vol. 18, No. 3, pp. 237-253, Mar. 1996.*

Kanitsar, et al., 2002. "CPR: curved planar reformation", Proceedings of the Conference on Visualization '02, Oct. 27-Nov. 1, 2002, Visualization, IEEE Computer Society, Washington, DC, pp. 37-44.*

K. L. Karau, et al., "Microfocal x-ray CT imaging and pulmonary arterial distensibility in excised rat lungs," American Journal Physiology Heart and Circulation Physiology, vol. 281, Issue 3, pp. H1447-H1457, Sep. 2001.*

Kirbas, C. and Quek, F., "A review of vessel extraction techniques and algorithms", ACM Computer Surveys (CSUR), vol. 36, Issue 2, Jun. 2004, pp. 81-121.*

Kukuk, Markus, "A model-based approach to intraoperative guidance of flexible endoscopy", dissertation Dortmund University, Princeton 2002, Mar. 2003, 195 pages, http://hdl.handle.net/2003/2571.*

Oda, M., Kitasaka, T., Hayashi, Y., Mori, K., Suenaga, Y., and Toriwaki, J., "Development of a navigation based cad system for colon," in [Medical Image Computing and Computer-Assisted Intervention: MICCAI 2005], Duncan, J. S. and Gerig, G., eds., Proc. Part 1, LNCS 3749, pp. 696-703 (Sep. 2005).*

Oda, M., Hayashi, Y., Kitasaka, T., Mori, K., and Suenaga, Y., "A method for generating virtual unfolded view of colon using spring model," in [Medical Imaging: Physiology, Function, and Structure from Medical Images], Manduca, A. and Amini, A. A., eds., Proc. SPIE 6143, 61431C-1-12 (2006).*

Bartroli et al., "Virtual Colon Unfolding", IEEE Visualization, 2001, pp. 411-420, Oct. 2001.

Bartroli et al; "Nonlinear Virtual Colon Unfolding", Institute of Computer Graphics and Algorithms, Vienna University of Technology, pp. 411-418.

* cited by examiner

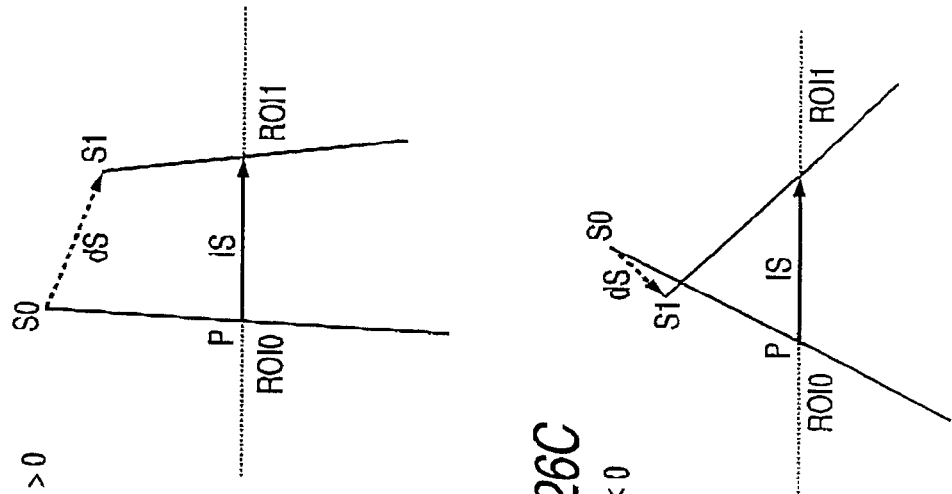
FIG. 26B  G[i] > 0
FIG. 26C  G[i] < 0
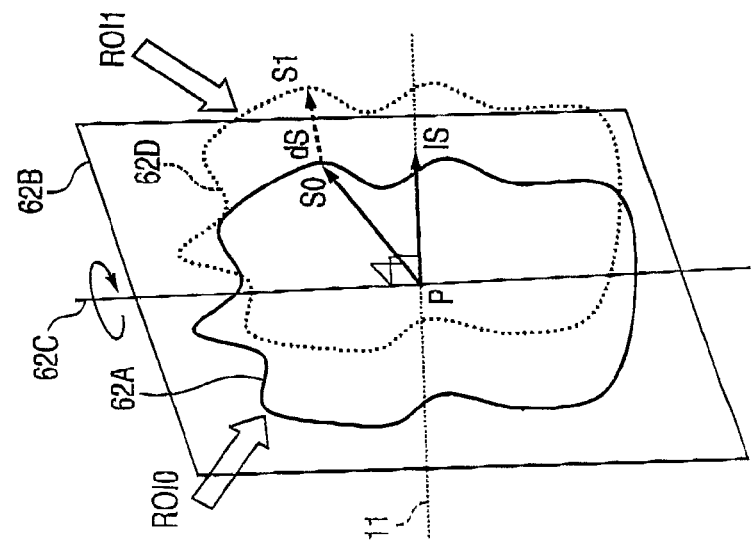
FIG. 26A

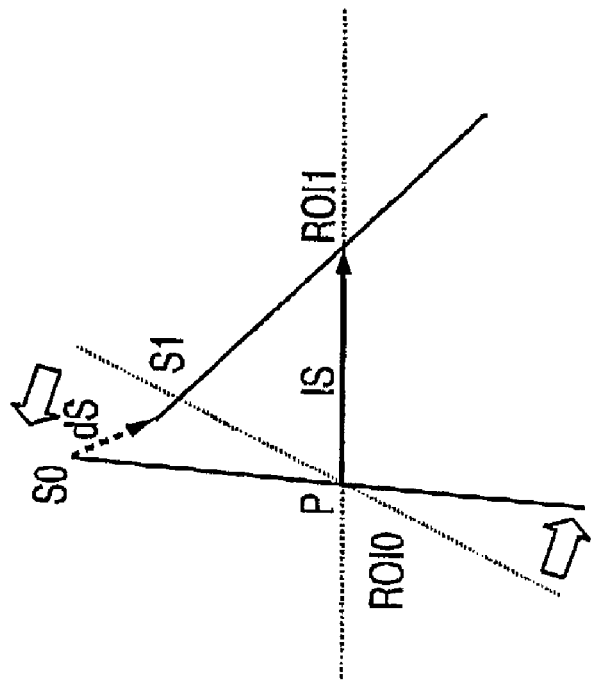
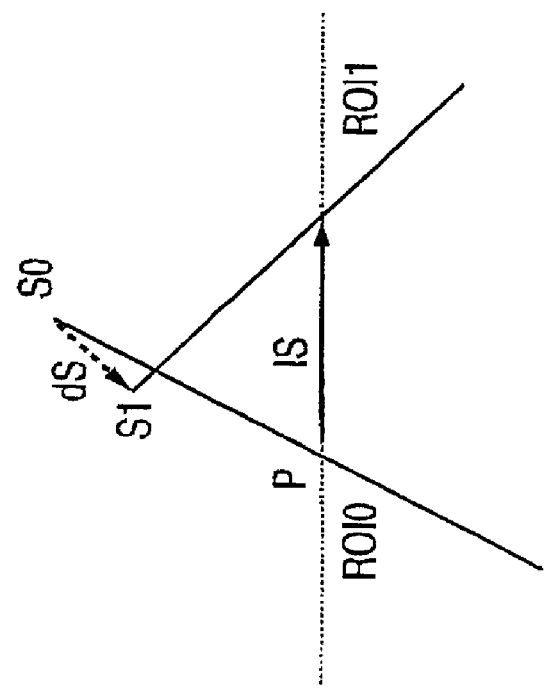

PRIOR ART
PRIOR ART
FIG. 30A
FIG. 30B
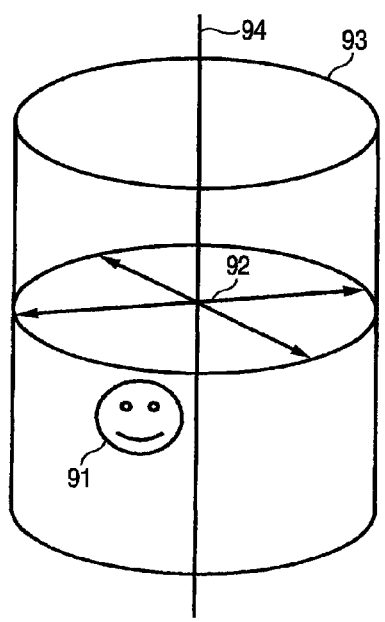
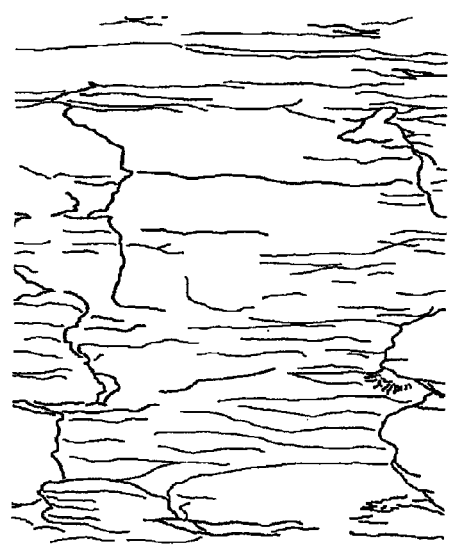

$C(h, \alpha)$ $I(u, v)$

PRIOR ART

IMAGE PROCESSING METHOD AND COMPUTER READABLE MEDIUM FOR IMAGE PROCESSING

This application claims foreign priority based on Japanese Patent application No. 2005-340949, filed Nov. 25, 2005, the content of which is incorporated herein by reference in its entirety.

BACKGROUND OF THE INVENTION

1. Field of the Invention

This invention relates to an image processing method and a computer readable medium for image processing for visualizing a tubular tissue.

2. Description of the Related Art

A technique for visualizing the inside of a three-dimensional object has attracted public attention with the advance of image processing technology using a computer in recent years. Particularly in the medical field, medical diagnosis using a CT (Computed Tomography) apparatus or MRI (Magnetic Resonance Imaging) apparatus has been performed widely because a lesion can be detected early by visualizing the inside of a living body.

On the other hand, volume rendering is known as a method for obtaining a three-dimensional image of the inside of an object. In volume rendering, ray is emitted onto a three-dimensional voxel (micro volume element) space to there by project an image on a projection plane. This operation is referred to as ray casing. In ray casting, a voxel value is acquired from a voxel at each sampling point which is sampled at a regular interval along the path of the ray.

The voxel is a unit for constituting a three-dimensional region of an object. The voxel value is a specific data expressing characteristic such as a density value of the voxel. The whole object is expressed by voxel data which is a three-dimensional arrangement of the voxel value. Generally, two-dimensional tomogram data obtained by CT is collected along a direction perpendicular to each sectional layer, and voxel data which is the three-dimensional arrangement of voxel value is obtained by performing necessary interpolation.

In ray casting, reflected light of a virtual ray emitted onto an object from a viewpoint is generated according to an opacity value artificially set for each voxel value. Then, the gradient of voxel data, that is, a normal vector is obtained to obtain a virtual surface, and a shading coefficient for shading is calculated from the cosine of an angle between the virtual ray and the normal vector. Reflected light is calculated by multiplying the intensity of the virtual ray emitted on each voxel, the opacity value of the voxel and the shading coefficient.

FIG. 28A shows an example of a colon being displayed by a parallel projection method of volume rendering as an example of visualization of a tubular tissue in the inside of a human body. According to such volume rendering, a fluoroscopic image of the three-dimensional structure of the colon can be formed from two-dimensional tomogram data obtained successively along a direction perpendicular to sectional layers of the abdomen. The image obtained by the parallel projection method is suitable for observation from the outside but unsuitable for observation from the inside.

FIG. 28B shows an example of achieving an image obtained by a virtual endoscope by generating a centrally projected image of the inside of the colon with volume rendering. When voxel data is reconstructed from a viewpoint in the inside of the tubular tissue in this manner, inspection with an endoscope can be simulated. Accordingly, a polyp or the like in the inside of the tubular tissue can be detected. However, the virtual endoscope image has a disadvantage that a large number of images obtained by the virtual endoscope has to be referred to perform diagnosis because the region allowed to be displayed at one time in each image obtained by the virtual endoscope is small.

FIGS. 29A and 29B are views for explaining a parallel projection method and a central projection method respectively In the parallel projection method, as shown in FIG. 29A, virtual ray 82 is emitted parallel from a viewpoint 81, and an image can be generated to observe an observation target 83 mainly from the outside. On the other hand, in the central projection method, as shown in FIG. 29B, virtual ray 85 is emitted radially from a viewpoint 84. In the central projection method, an image with perspective and reality as the human sees an observation target 86 with his eyes can be generated.

FIGS. 30A and 30B show an example of display of an exfoliated image of a tubular tissue using a cylindrical coordinate system in ray casting. According to the central projection method shown in FIG. 29B, inspection of the colon or the like with an endoscope can be simulated, but it is difficult to understand the position or size of a polyp or the like in the wall of the tubular tissue accurately when the inside of the colon is inspected while scanned.

Therefore, as shown in FIG. 30A, a viewpoint 91 is placed on a center line 94 of a colon 93. Virtual ray 92 is radiated from the viewpoint 91 in directions perpendicular to the center line 94, and an image of the inner wall surface of the colon 93 is generated. Then, the image is cut open in parallel to the center line 94 so that an exfoliated image of the inner wall surface of the colon can be displayed as shown in FIG. 30B.

FIGS. 31A to 31E are views for explaining a cylindrical projection method using a cylindrical coordinate system. FIG. 31A shows a cylindrical coordinate system 102 set in the inside of a tubular tissue 101 and a virtual ray 103 radiated from the center axis of the cylindrical coordinate system 102. FIG. 31B shows a state in which the cylindrical coordinate system 102 is represented as $C(h,\alpha)$ based on a distance h along the center axis and an angle $\alpha$ around the center axis. FIG. 31C shows a state in which the cylindrical coordinate $C(h,\alpha)$ is exfoliated and converted into two-dimensional coordinates $l(u,v)$ Each of FIGS. 31D and 31E shows a state in which the virtual ray 103 is radiated from the center axis of the tubular tissue 101. Accordingly, by assuming that a cylindrical coordinate system 102 is set virtually in the inside of a tubular tissue 101 and performing the projection radially from the center axis of the cylindrical coordinate system 102 in this manner, a 360° panoramic image of the inner wall surface of the tubular tissue 101 can be generated.

FIGS. 32A and 32B are views for explaining a curved cylindrical projection method when a tubular tissue as a observation object is curved. As shown in FIGS. 32A and 32B, the curved cylindrical projection method is a method of projection in which virtual ray 113 is radiated from a curved center line 112 when the tubular tissue 111 as a observation object is curved. As described above, in accordance with the curved cylindrical projection method, by assuming the central path 112 along the real curved internal organ of the human body, and by performing projection with the central path 112 as the center, virtual endoscopy inspection can be performed with CT data.

FIG. 33 is a flowchart of a curved cylindrical projection method in a related art. In the curved cylindrical projection method in the related art, first a central path is set (step S11) and a position t on the central path is initialized to t=0 (step S12).

Next, coordinates P (x, y, z) of the position t on the central path and a direction vector D (x, y, z) of the center path of the position t on the central path are acquired (step S13) Virtual rays are projected 360° on a plane, which is perpendicular to D (x, y, z) from P (x, y, z) (step S14).

Next, t is incremented (step S15), and to determine whether or not the end point position is reached, a comparison is made between the values of t and t_max. If t is smaller than t_max (YES), the process returns to step S12; if t is equal to or greater than t_max (NO), the processing is completed.

Thus, the curved cylindrical projection method in the related art becomes the same as the cylindrical projection method in the related art wherein every ray projected from a point on one central path lies along a plane having D (x, y, z) as a normal vector.

A method of projecting virtual rays so as to follow a virtual magnetic curve created from a path (for example, refer to U.S. Pat. No. 6,212,420), and a method of expanding an observation object using a finite element method before conducting cylindrical projection (for example, refer to "Virtual Colon Unfolding," A. Vilanova Bartroli, R. Wegenkittl, A. Konig, E. Groller, IEEE Visualization, USA, 2001, p 411-420) are known as related arts.

FIG. 34 is a drawing to describe a problem of the curved cylindrical projection method in the related art. In the curved cylindrical projection method in the related art, virtual rays 118 to 127 are projected perpendicularly from a central path 112 (the normal vector of the plane along which the virtual rays lie is the same direction as the central path 112) and thus virtual rays 123 and 124 and virtual rays 125 and 126 cross each other in a large bend portion B of the central path 112.

If virtual rays 118, 119, 120, 121, etc., quiver in subordination to a meandering of the central path 112, then this results in an image difficult to grasp the state of a large intestine 111. That is, in a straight portion A of the large intestine 111, the virtual rays faithfully quiver in subordination to a meandering of the central path 112 and scales 128 and 129 of the image effected and thus the representation of a physical length changes according to the position on the image along the central path 112. Since the virtual rays cross each other in the large bend portion B of the central path 112, the same observation object 130 is duplicately displayed in the crossing part.

In "Virtual Colon Unfolding", A. Vilanova Bartroli, R. Wegenkittl, A. Konig, E. Groller, IEEE Visualization, USA, 2001, p 411-420, above problem is tried to be solved by a method in which a folded structure of a surface of the target internal organ is unfolded by an approach of finite-element deformation after obtaining the shape of the surface of the target internal organ. However, it is difficult to say that this method is practical, because this method has disadvantages such as that subjective and complex condition setting is necessary in the extraction of the surface of the internal organ, and in the process of unfolding, lesion can not be detected because polyp is also unfolded, and calculation for extracting and unfolding the surface of the internal organ is enormous. Further, in U.S. Pat. No. 6,212,420 using the virtual magnetic curve, there exists an enormous load for calculating the magnetic curve.

SUMMARY OF THE INVENTION

The present invention has been made in view of the above circumstances, and provides an image processing method and a computer readable medium for image processing capable of preventing the scale on an image effected according to the meandering of central path without increasing calculation load, and preventing duplicate display of the same observation object in a portion where the central path largely bends.

In some implementations, an image processing method of the invention for visualizing information of an observation object, the image processing method comprising:
setting a path which is a center line of the observation object;
determining a region that includes the information to be visualized;
setting a plurality of planes crossing the path, each of said planes does not cross each other in the region; and
projecting virtual rays onto the observation object from points on the path so as to visualize the information near the path.

According to the configuration, to project a virtual ray from a point along the path, the direction of each plane along which the virtual ray lies is changed so that the planes do not cross each other in the determined region, and thus duplicate display of the same observation object is not produced even in the portion where the path largely bends, and the lesion part can be grasped precisely. According to the configuration, the virtual rays are prevented from crossing each other in the determined region, whereby the calculation load can be decreased as compared with the related art technique using a curve to prevent the virtual rays from crossing each other in the whole image.

In the image processing method of the invention, the region is a region within a predetermined distance from the path.

In the image processing method of the invention, the region is a region of a tubular tissue as the observation object.

In the image processing method of the invention, the region is an expanded region of a tubular tissue as the observation object.

According to the configuration, the directions of the planes are adjusted so that the planes do not cross each other in a region within a predetermined distance from the path, a region of the tubular tissue to be observed, or an expanded region of the tubular tissue to be observed, whereby the processing time can be shortened and a precise projection image can be displayed at high speed.

The image processing method of the invention comprising obtaining a normal vector of each of the planes,
wherein the direction of each of the planes is changed so that an angle between the normal vectors of the adjacent planes becomes small.

The image processing method of the invention comprising:
setting a virtual spring that connects the adjacent planes,
wherein the direction of each of the planes is changed so that energy of the virtual spring becomes small.

According to the configuration, the direction of the plane is changed so that the angle between the normal vectors of the adjacent planes lessens or that the virtual spring energy between the adjacent planes lessens. Accordingly, quiver of the virtual rays along the path lessens and effect of the scale on the image along the path can be prevented and in the portion where the path largely bends, duplicate display of the same observation object can also be prevented.

The image processing method of the invention comprising:
generating a projection image by volume rendering by the projected virtual rays.

The image processing method of the invention comprising:
generating a projection image by surface rendering by the projected virtual rays.

The image processing method of the invention comprising:
generating a projection image by network distributed processing by the projected virtual rays.

The image processing method of the invention comprising:
generating a projection image using a GPU (Graphic Processing Unit) by the projected virtual rays.

The image processing method of the invention comprising:
generating a medical image by the virtual rays being projected onto a tubular tissue in a human body.

In some implementations, a computer readable medium of the invention having a program including instructions for permitting a computer to perform image processing for visualizing information of a observation object, the instructions comprising:

setting a path which is a center line of the observation object;

determining a region that includes the information to be visualized;

setting a plurality of planes crossing the path, each of said planes does not cross each other in the region; and projecting virtual rays onto the observation object from points on the path so as to visualize the information near the path.

BRIEF DESCRIPTION OF THE DRAWINGS

In the accompanying drawings:

FIGS. 26A, 26B and 26C are schematic representations (NO. 1) for changing D (x, y, z) [t] so that G [i] becomes all zero or more in a third embodiment of the invention;

FIGS. 27A and 27B are schematic representations (NO. 2) for changing D (x, y, z) [t] so that G [i] becomes all zero or more in a third embodiment of the invention;

FIGS. 30A and 30B show examples of unfolding display of a tubular tissue using a cylindrical coordinate system in ray casting;

DESCRIPTION OF THE PRFERRED
EMBODIMENTS

Figure 1:
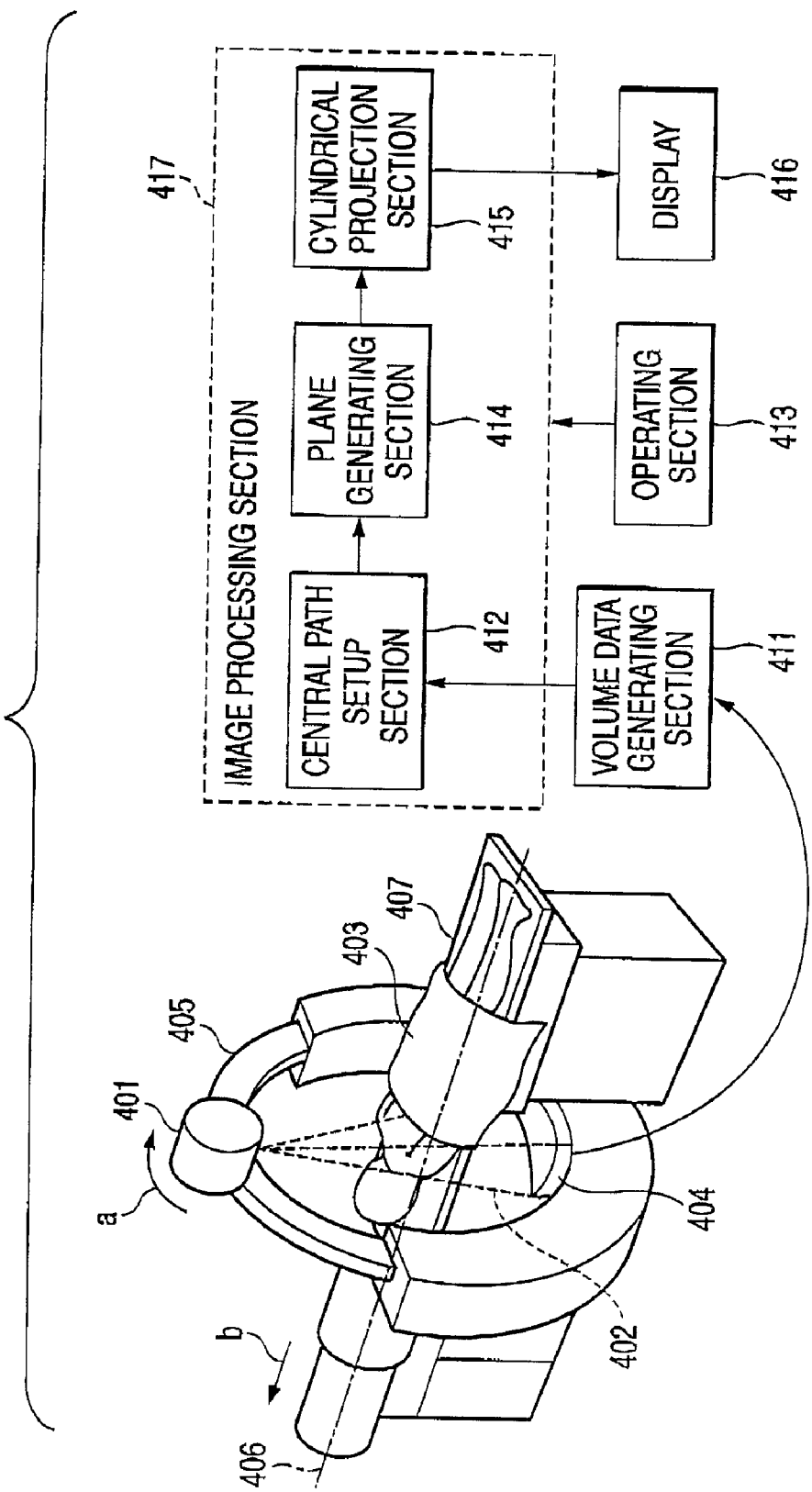
FIG. 1 is a drawing to schematically show a computerized tomography (CT) apparatus used with an image processing method according to some embodiments of the invention.

FIG. 1 schematically shows a computed tomography (CT) apparatus used in an image processing method according to some embodiments of the invention. The computed tomography apparatus is used for visualizing tissues, etc., of a subject. A pyramid-like X-ray beam 402 having edge beams which is represented by dotted lines in FIG. 1 is emitted from an X-ray source 401. The X-ray beam 402 is applied on an X-ray detector 404 after transmitting through the subject, for example, a patient 403. In the embodiments, the X-ray source 401 and the X-ray detector 404 are disposed in a ring-like gantry 405 so as to face each other. The ring-like gantry 405 is supported by a retainer not shown in FIG. 1 so as to be rotatable (see the arrow "a") about a system axis 406 which passes through the center point of the gantry.

The patient 403 is lying on a table 407 through which the X-rays are transmitted. The table 407 is supported by a retainer which is not shown in FIG. 1 so as to be movable (see the arrow "b") along the system axis 406.

Thus a measuring system is configured so that the X-ray source 401 and the X-ray detector 404 are rotatable about the system axis 406 and movable along the system axis 406 relatively to the patient 403. Accordingly, X-rays can be cast on the patient 403 at various projection angles and in various positions with respect to the system axis 406. An output signal from the X-ray detector 404 when the X-rays are cast on the patient 403 are supplied to a volume data generating section 411 and converted into a volume data.

In sequence scanning, the patient 403 is scanned in accordance with each sectional layer of the patient 403. When the patient 403 is scanned, while the X-ray source 401 and the X-ray detector 404 rotate around the patient 403 about the system axis 406 as its center, the measuring system including the X-ray source 401 and the X-ray detector 404 captures a large number of projections to scan each two-dimensional sectional layer of the patient 403. A tomogram displaying the scanned sectional layer is reconstructed from the measured values acquired at that time. While the sectional layers are scanned continuously, the patient 403 is moved along the system axis 406 every time the scanning of one sectional layer is completed, This process is repeated until all sectional layers of interest are captured.

On the other hand, during spiral scanning, the table 407 moves along the direction of the arrow "b" continuously while the measuring system including the X-ray source 401 and the X-ray detector 404 rotates about the system axis 406. That is, the measuring system including the X-ray source 401 and the X-ray detector 404 moves on a spiral track continuously and relatively to the patient 403 until the region of interest of the patient 403 is captured completely. In this embodiment, signals of a large number of successive sectional layers in a diagnosing area of the patient 403 are supplied to a volume data generating section 411 by the computed tomography apparatus shown in FIG. 1.

Volume data generated by the volume data generating section 411 is introduced into a central path setup section 412 in an image processing section 417. The central path setup section 412 sets the central path of the tubular tissue contained in the volume data. A plane generating section 414, which is described later in detail, determines the plane along which a virtual ray used for cylindrical projection is projected from the set central path and volume data. The plane generated in the plane generating section 414 is supplied to a cylindrical projection section 415.

The cylindrical projection section 415 performs cylindrical projection using volume data in accordance with the plane generated in the plane generating section 414 to generate a cylindrical projection image. The cylindrical projection image provided by the cylindrical projection section 415 is supplied to a display 416 for displaying the image. In addition to a display of the cylindrical projection image, combined display of a histogram, parallel display of a plurality of images, animation display of displaying a plurality of images in sequence, simultaneous display with a virtual endoscope (VE) image, etc., is produced on the display 416.

An operating section 413 performs the setting of the central path, plane generation, and the display angle in spherical cylindrical projection in response to an operation signal from a keyboard, a mouse, etc., generates a control signal of each set value, and supplies the control signal to the central path setup section 412, the plane generating section 414, and the cylindrical projection section 415. Accordingly, while viewing the image displayed on the display 416, the user can change the image interactively and can observe a lesion in detail.

First Embodiment

Figure 2:
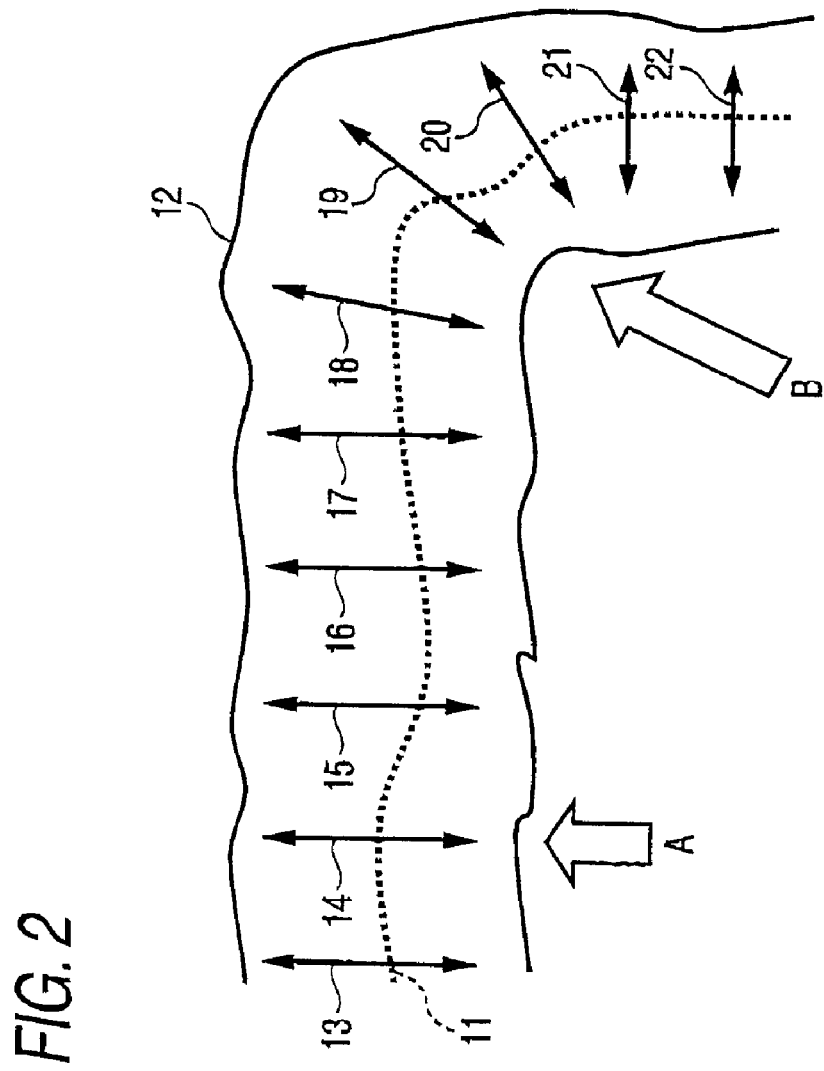
FIG. 2 is a drawing to describe a corrected cylindrical projection method according to a first embodiment in the image processing method of the invention.

FIG. 2 is a drawing to describe a corrected cylindrical projection method according to a first embodiment in the image processing method of the invention. In the corrected cylindrical projection method of the embodiment, a cylindrical projection section 415 adjusts the projection direction so that adjacent virtual rays do not cross each other at least in a large intestine 12 from a central path 11. Unlike conventional method which, projects virtual rays 13 to 22 uniformly perpendicular from the central path 11.

For example, in a straight portion A where the central path 11 meandering, the projection direction is adjusted so that the virtual rays 13, 14, 15, and 16 become almost parallel. In a bend portion B where the central path 11 largely bends, the projection direction is adjusted so that the virtual rays 18, 19, 20, and 21 gradually bend.

Accordingly, in the straight portion A, quivering of the virtual rays along the central path 11 lessens and effect of the scale on the image along the central path 11 can be prevented. In the bend portion B where the central path 11 largely bends, duplicate display of the same observation object can be prevented.

Figure 3:
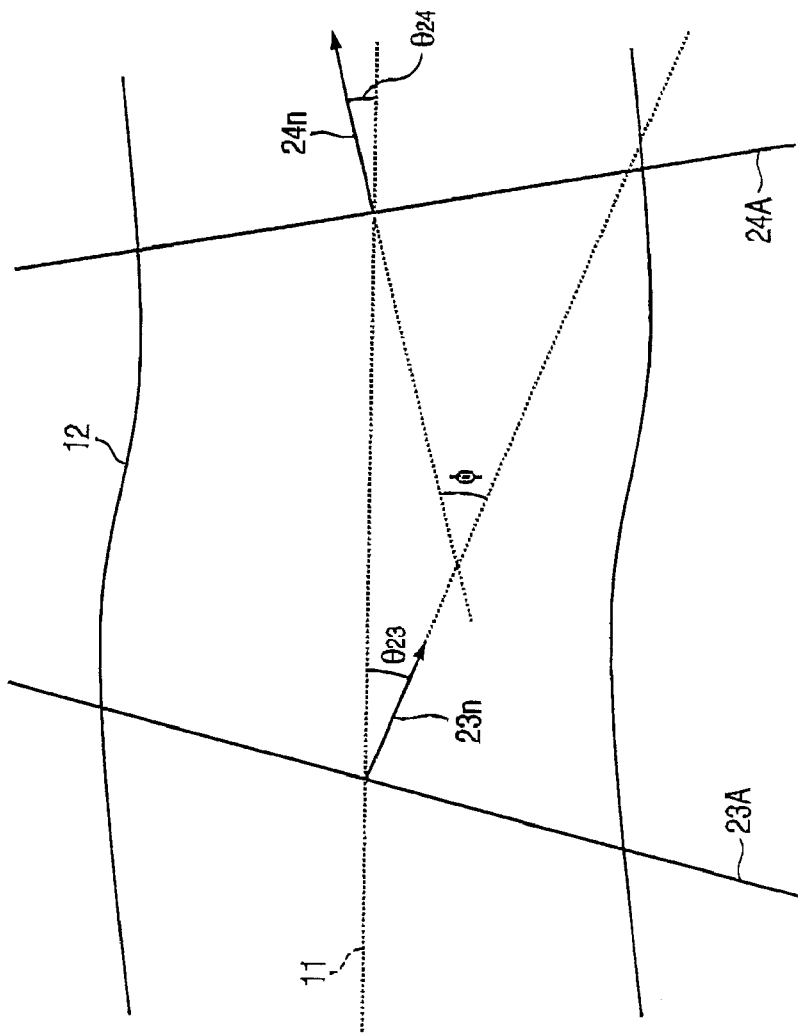
FIG. 3 is a schematic representation of a plane along which a virtual ray lies and normal vectors of the plane.

FIG. 3 is a schematic representation of a plane which a virtual ray lies along and a normal vector of the plane. In the embodiment, the normal vector of the plane along which a virtual ray lies is obtained and the direction of the plane is changed so that the angle between each normal vectors of the adjacent planes lessens. This is performed by adjusting angles θ23, θ24 and φ, where θ23 and θ24 are angles between normal vectors 23n and 24n of the planes 23A, 24A and the central path 11 respectively, and φ is the angle between the adjacent normal vectors.

Accordingly, quiver of the virtual rays along the path lessens and effect of the scale on the image along the path can be prevented and in the portion where the path largely bends, duplicate display of the same observation object can also be prevented.

Figure 4:
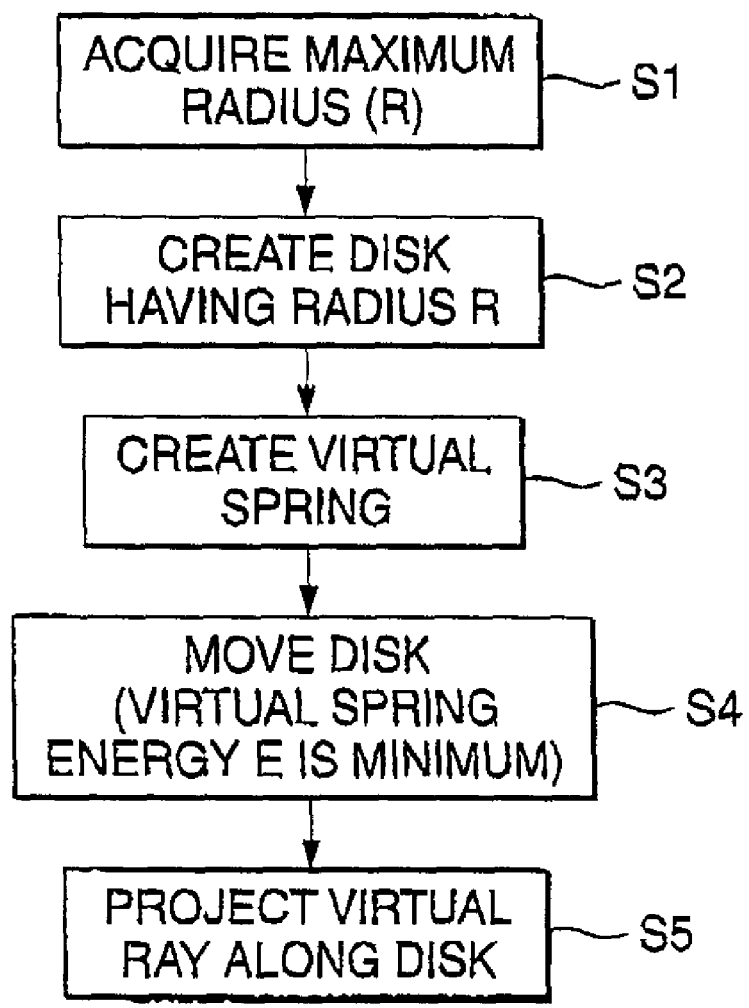
FIG. 4 is a flowchart to show an outline of processing of the corrected cylindrical projection method in the image processing method of a first embodiment of the invention.

Brief processing steps of the corrected cylindrical projection method in the image processing method of the embodiment will be discussed with reference to FIG. 4. In the corrected cylindrical projection method of the embodiment, first the maximum radius (R) of the large intestine 12 is acquired (step S1). A disk having the radius R perpendicular to the central path 11 is created (step S2). It is intended that virtual rays are projected along each disk, whereby the condition that virtual rays do not cross each other is replaced with the condition that disks do not hit each other for simplifying calculation process.

Next, a virtual spring for connecting the contours of the disks is created (step S3) and the disk is moved so that virtual spring energy E becomes the minimum (step S4). A virtual ray is projected along the disk (step S5). In this case, the condition that the virtual rays (disks) do not cross each other is obtained in a state in which the virtual spring energy E becomes the minimum. In so doing, the virtual rays do not cross each other until they reach the projection plane.

Figures 5A, 5B:
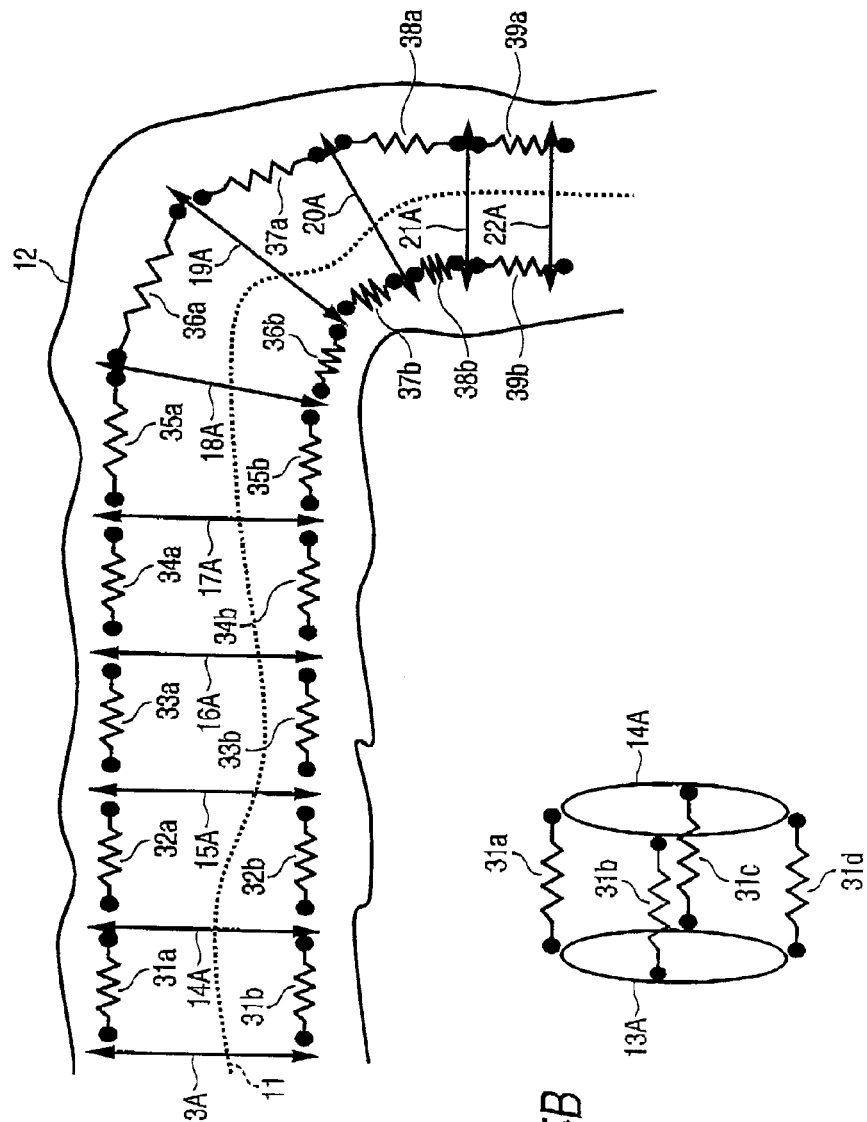
FIGS. 5A and 5B are drawings to describe a state in which a large intestine 12 is approximated by disks and the disks are connected by virtual springs in the image processing method of a first embodiment of the invention.

FIGS. 5A and 5B are drawings to describe a state in which the large intestine 12 is approximated by disks each having a given radius and the disks are connected by virtual springs. In the embodiment, disks 13A to 22A having the maximum radius (R) of the large intestine 12 are created and the contours of the disks are connected by virtual springs 31a to 39b.

FIG. 5A shows two-dimensionally a state in which the adjacent disks 13A, 14A, etc., along the path are connected by virtual springs 31a, 31b, etc., and FIG. 5B shows three-dimensionally a state in which the two adjacent disks 13A and 14A are connected by, for example, four virtual springs 31a, 31b, 31c, and 31d. To secure three-dimensional degree of freedom, the minimum number of the virtual springs between the two adjacent disks is three, but more than three virtual springs may be used to pursue stability and efficiency of calculation. The centers of the adjacent disks can also be connected by one virtual spring which bends, Further, the coordinates of the centers of the disks are fixed.

Thus, the contours of the adjacent disks are connected by the virtual springs and the directions of the disks are adjusted so that the virtual spring energy E becomes the minimum, so that the adjacent disks are prevented from crossing each other. Virtual rays are projected along the disks for generating an image of the inside of the large intestine 12.

Accordingly, quiver of the virtual rays along the central path 11 lessens and effect of the scale on the image along the central path 11 can be prevented and in the portion where the central path 11 largely bends, duplicate display of the same observation object can also be prevented.

Figure 6:
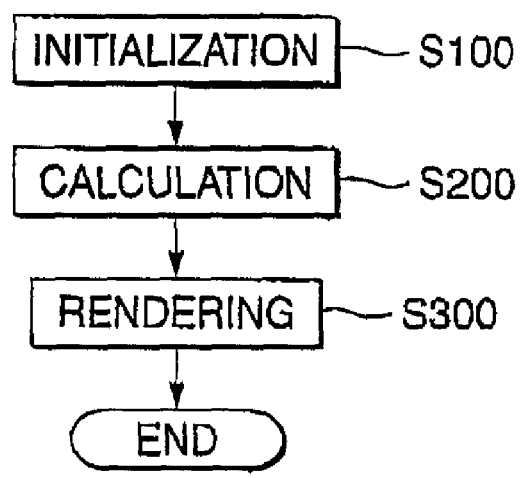
FIG. 6 is a flowchart to show the general processing in the corrected cylindrical projection method of a first embodiment of the invention.

Next, the corrected cylindrical projection method in the image processing method of the embodiment will be discussed in detail according to flowcharts. FIG. 6 is a flowchart to show the general processing in the corrected cylindrical projection method of the embodiment, That is, the corrected cylindrical projection method of the embodiment is made up of an initialization phase (step S100), a calculation phase (step S200), and a rendering phase (step S300).

Figure 7:
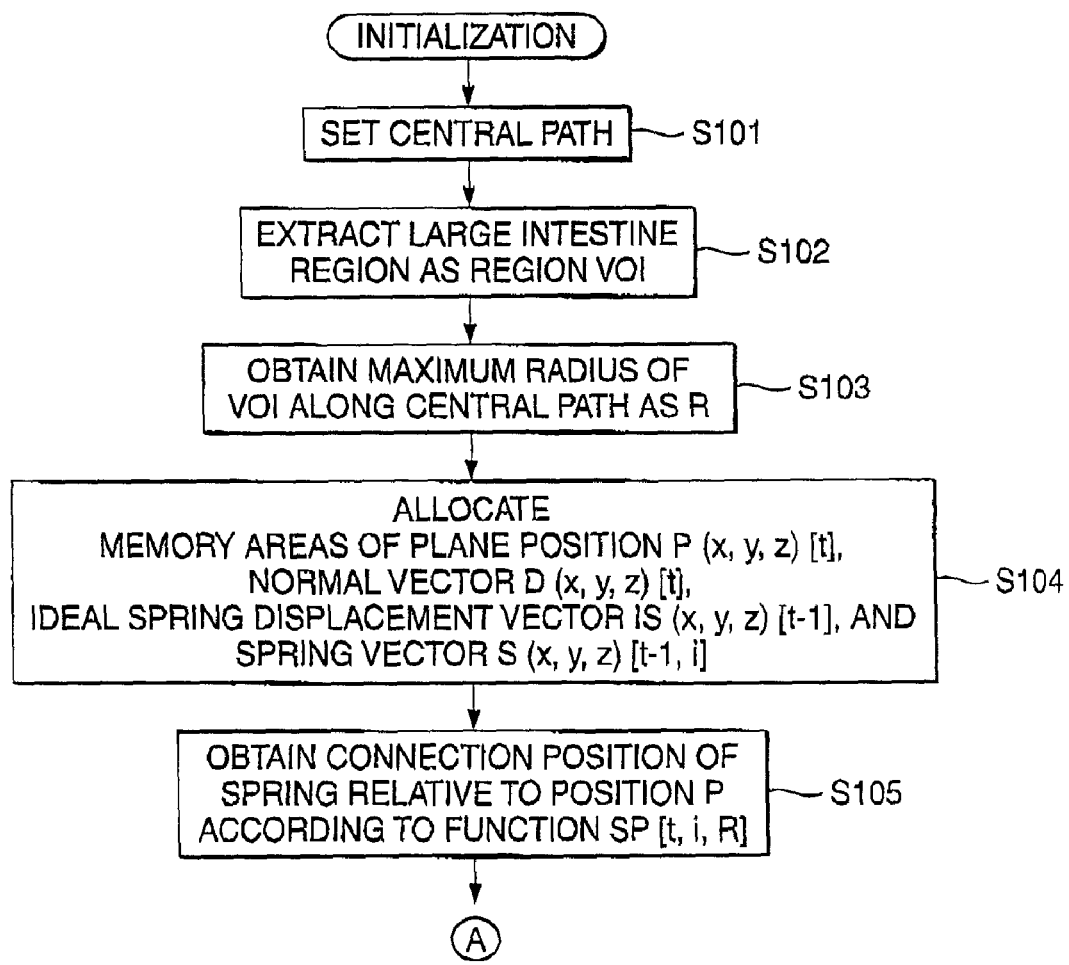
FIG. 7 is a flowchart (No. 1) of an initialization phase in the corrected cylindrical projection method of a first embodiment of the invention.
Figure 8:
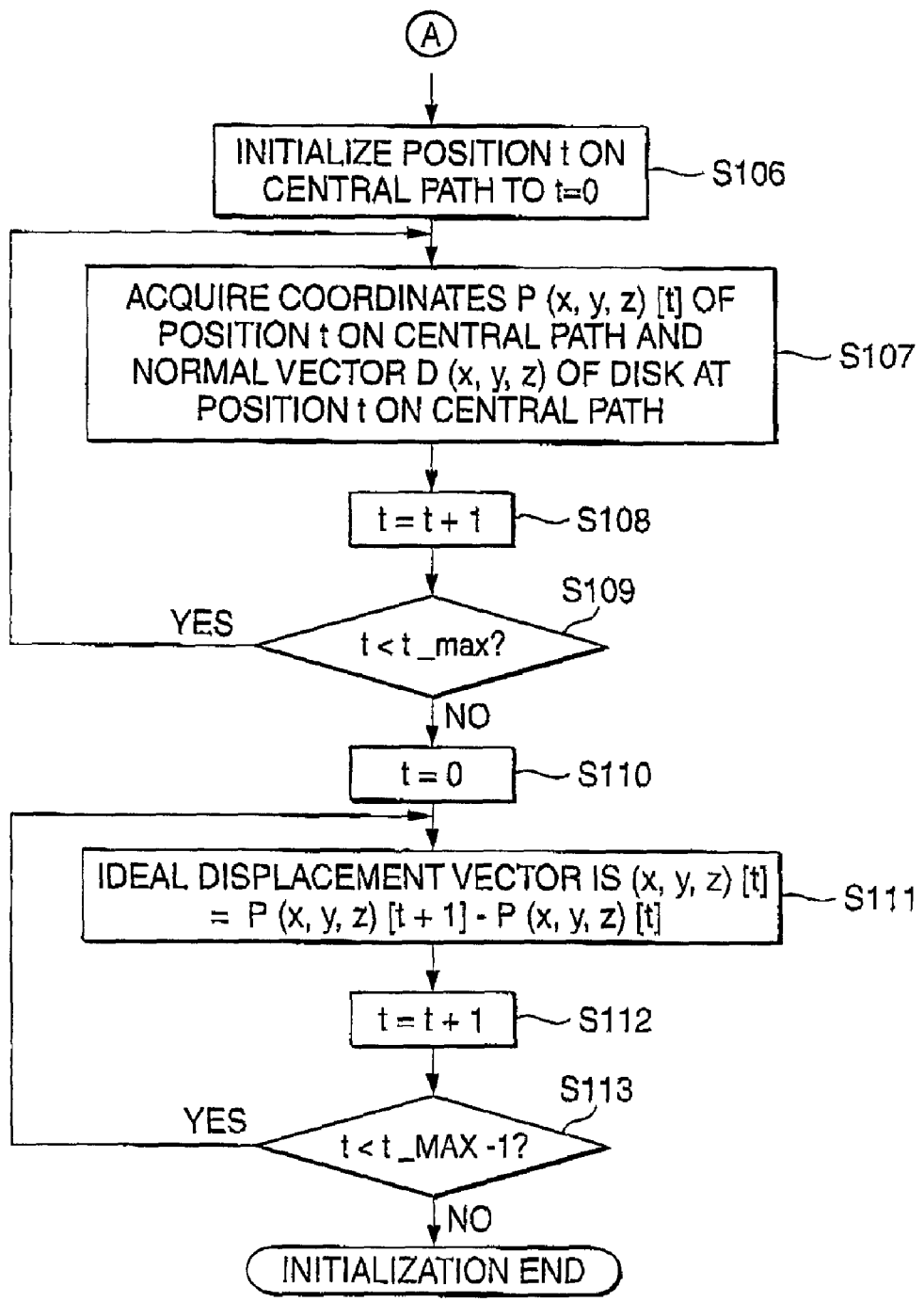
FIG. 8 is a flowchart (No. 2) of the initialization phase in the corrected cylindrical projection method of a first embodiment of the invention.

FIGS. 7 and 8 are flowcharts of the initialization phase in the corrected cylindrical projection method of the embodiment. In the initialization phase, first a central path is set (step S101) and the region of a large intestine is extracted as a region VOI (step S102). The maximum radius of the region VOI along the central path is obtained as R (step S103). To extract the region VOI, for example, any known method such as a Region Growing method or a Level Set Segmentation method can be used. To acquire the radius R, virtual spheres of radius R each having its center on each point on the central path are assumed, and the minimum R to allow a tubular region containing all virtual spheres to completely contain the region VOI is obtained.

Figure 9:
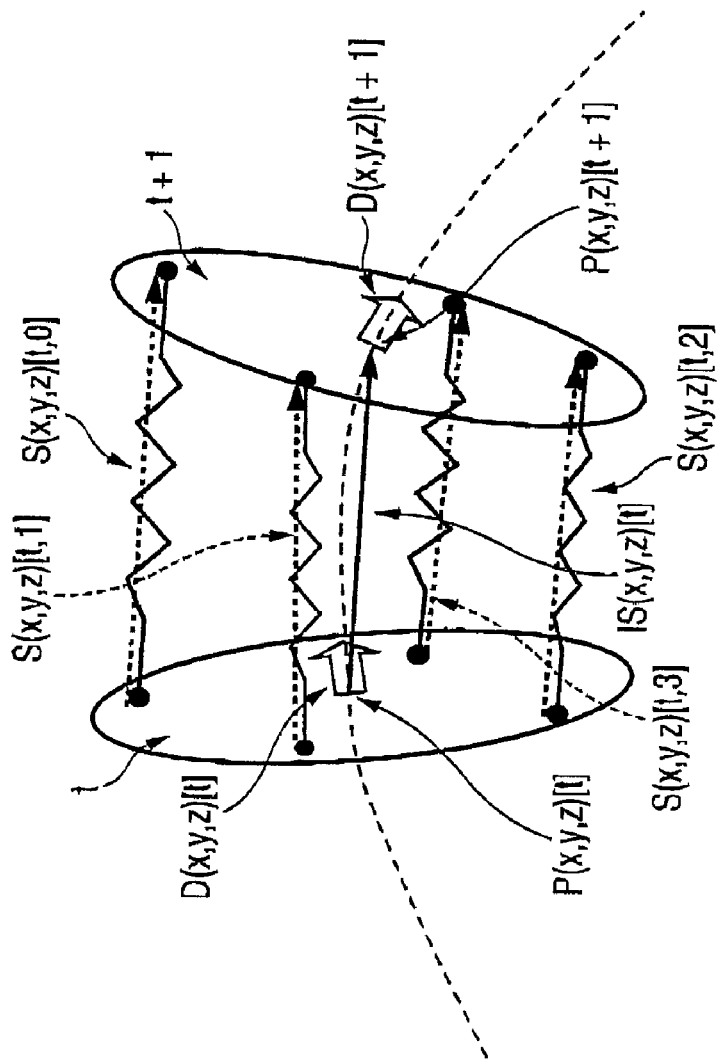
FIG. 9 is a schematic representation to show definition of variables.

Next, memory areas for following arrays are allocated. Plane reference position P (x, y, z) [t] of a disk at a position t on a central path, normal vector D (x, y, z) [t] of the disk, an ideal spring displacement vector IS (x, y, z) [t−1], and a spring vector S (x, y, z) [t−1, i] (step S104) (FIG. 9). The ideal spring displacement vector IS (x, y, z) [t−1] is a direction vector of the central path between two adjacent disks and represents the length of a spring when the spring displacement is 0. When the spring is connected to the edge of a disk, the spring is extended or compressed depending on how the central path bends. The deflection at the spring compressing time is not considered.

Next, the connection position of the spring (spring contact) relative to the position P is obtained according to a function SP [t, i, P] (step S105) Position t on the central path is initialized to t=0 (step 5106) and the coordinates P (x, y, z) [t] of the position t on the central path and the normal vector D (x, y, z) of the disk at the position t on the central path are acquired (step S107).

Next, t is incremented (step 5108) and a comparison is made between t and t_max (step S109). If t is smaller than t_max (YES), the process returns to step S107; if t is equal to or greater than t_max (NO), t is set to 0 (step S110) and ideal displacement IS (x, y, z) [t]=P (x, y, z) [t+1]−P (x, y, z) [t] is calculated (step S111).

Next, t is incremented (step S112) and a comparison is made between t and t_max−1 (step S113). If t is smaller than t_max−1 (YES), the process returns to step S111; if t is equal to or greater than t_max−1 (NO), the initialization is completed.

Figure 10:
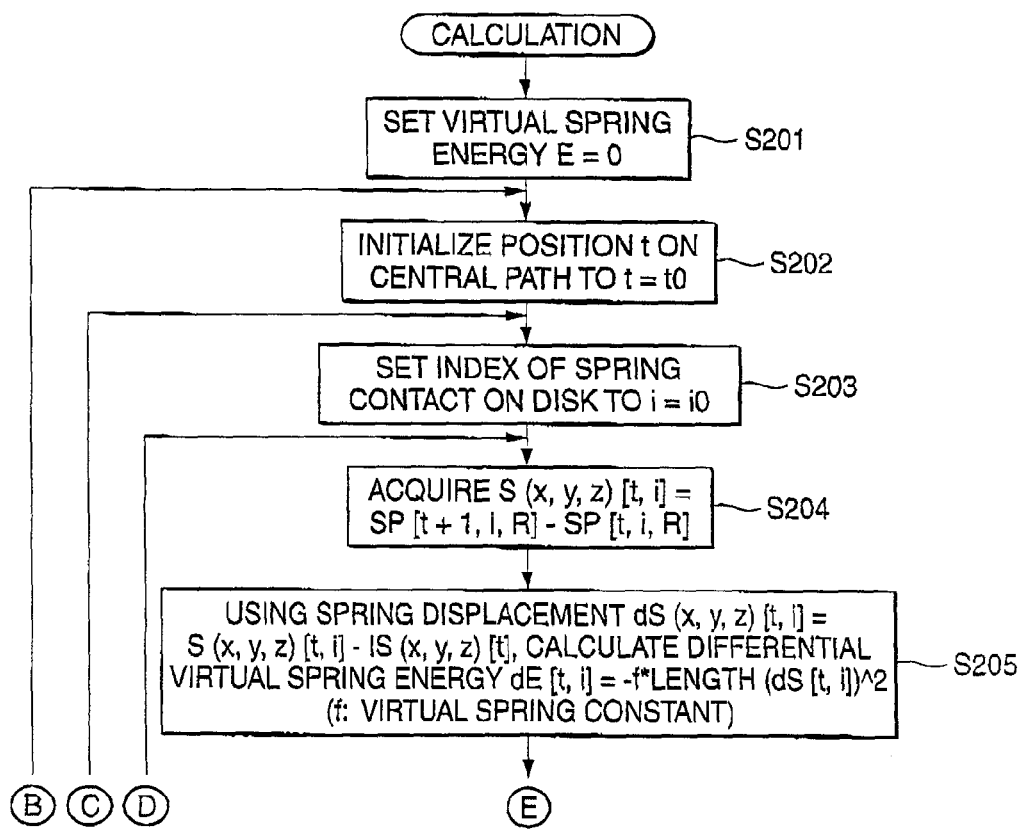
FIG. 10 is a flowchart (No. 1) of a calculation phase in the corrected cylindrical projection method of a first embodiment of the invention.
Figure 11:
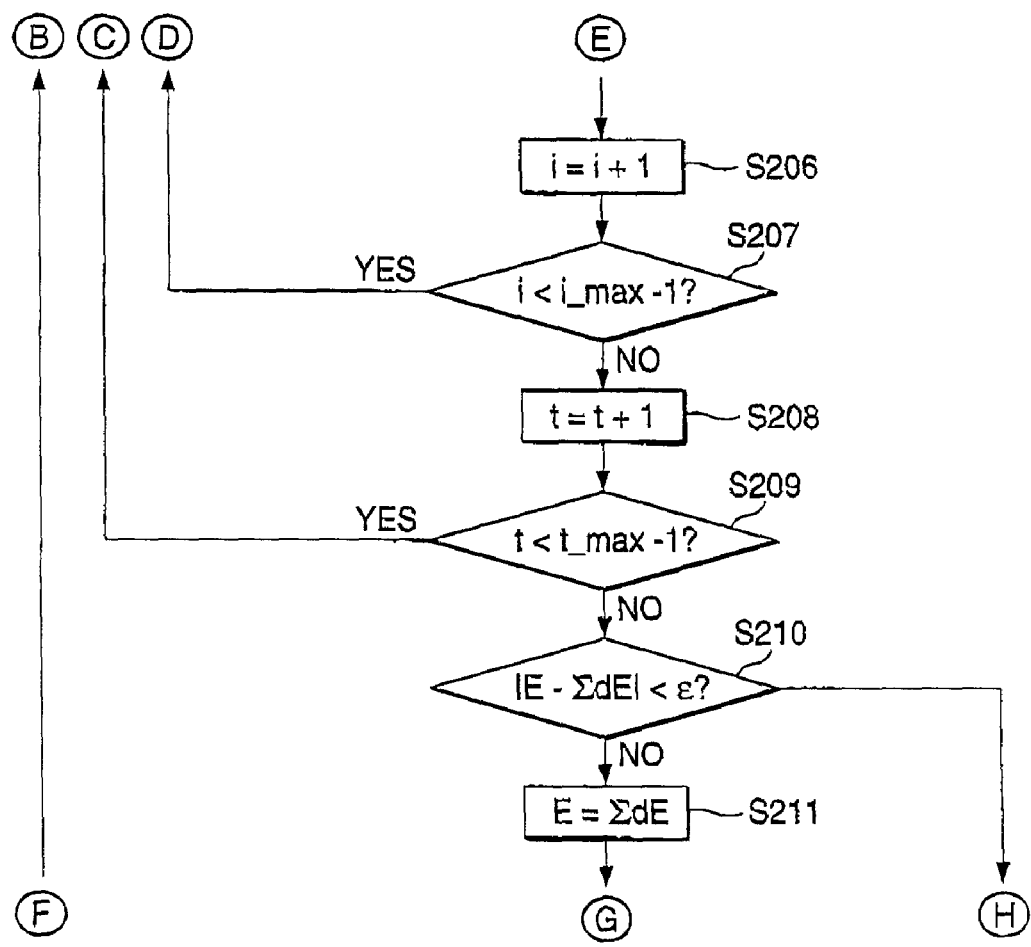
FIG. 11 is a flowchart (No. 2) of the calculation phase in the corrected cylindrical projection method of a first embodiment of the invention.
Figure 12:
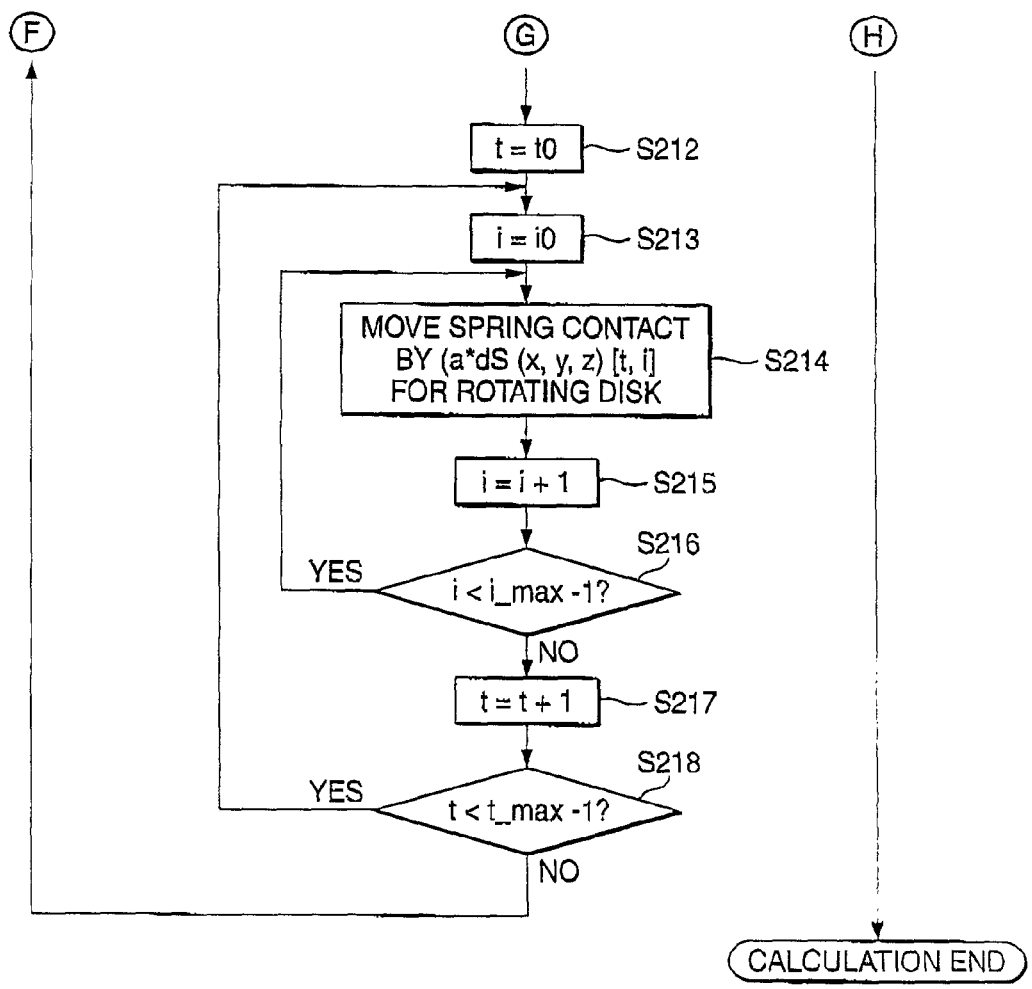
FIG. 12 is a flowchart (No. 3) of the calculation phase in the corrected cylindrical projection method of a first embodiment of the invention.

FIGS. 10, 11, and 12 are flowcharts of the calculation phase in the corrected cylindrical projection method of the embodiment. In the calculation phase, first the virtual spring energy E is set to 0 (step S201), the position t on the central path is initialized to t=t0 (step S202), and an index of a spring contact on the disk is set to i=0 step S203).

Next, S (x, y, z) [t, i]=SP [t+1, i, R]−SP [t, i, R] is acquired (step S204) and using spring displacement dS (x, y, z) [t, i]=S (x, y, z) [t, i]−IS (x, y, z) [t], differential virtual spring energy dE [t, i]=−f*length (dS [t, i])^2 (^2 represents a square) is calculated (f: Virtual spring constant) (step S205).

Next, i is incremented (step S206) and a comparison is made between i and i_max−1 (step S207). If i is smaller than i_max−1 (YES), the process returns to step S204; if i is equal to or greater than i_max−1 (NO), one is added to t (step S208).

Next, a comparison is made between t and t_max−1 (step S209). If t is smaller than t_max−1 (YES), the process returns to step S203; if t is equal to or greater than t_max−1 (NO), a comparison is made between |E−ΣdE| and ε (step S210). If |E−ΣdE| is smaller than ε (YES), it is assumed that the calculation sufficiently converges, and the calculation is completed. If |E−ΣdE| is equal to or greater than ε (NO), E=ΣdE (step S211).

Figure 13A:
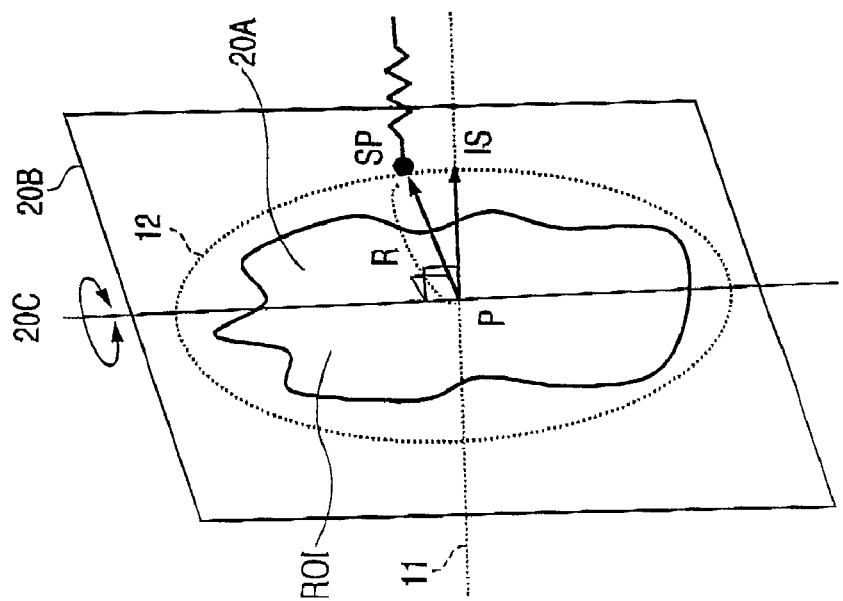
FIGS. 13A and 13B are schematic representations for moving a spring contact by (a*dS (x, y, z) [t, i] for rotating a plane in a first embodiment of the invention.
Figure 13B:
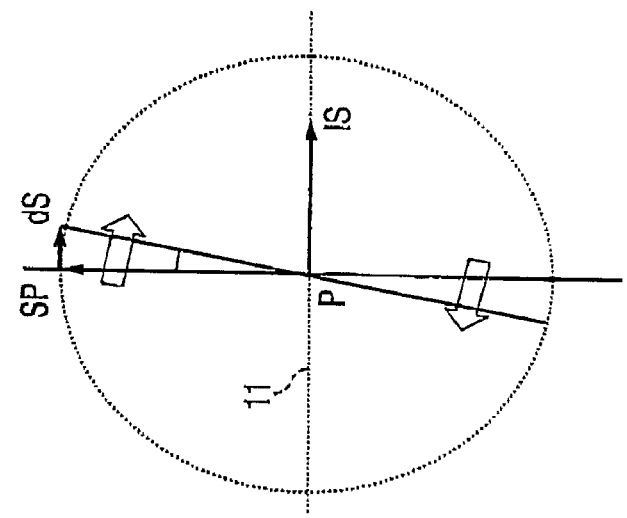

Next, t is set to t0 (step S212), i is set to i0 (step S213), and the spring contact is moved by (a*dS (x, y, z) [t, i] for rotating the disk (a: Displacement amount coefficient per iteration) (step S214: See FIGS. 13A and 13B) Accordingly, the adjacent disks do not cross each other in a stable state.

Next, i is incremented (step S215) and a comparison is made between i and i_max−1 (step S216). If i is smaller than i_max−1 (YES), the process returns to step S214; if i is equal to or greater than i_max−1 (NO), t is incremented (step S217). A comparison is made between t and t_max−1 (step S218). If t is smaller than t_max−1 (YES), the process returns to step 5213; if t is equal to or greater than t_max−1 (NO), the process returns to step S202.

Figure 14:
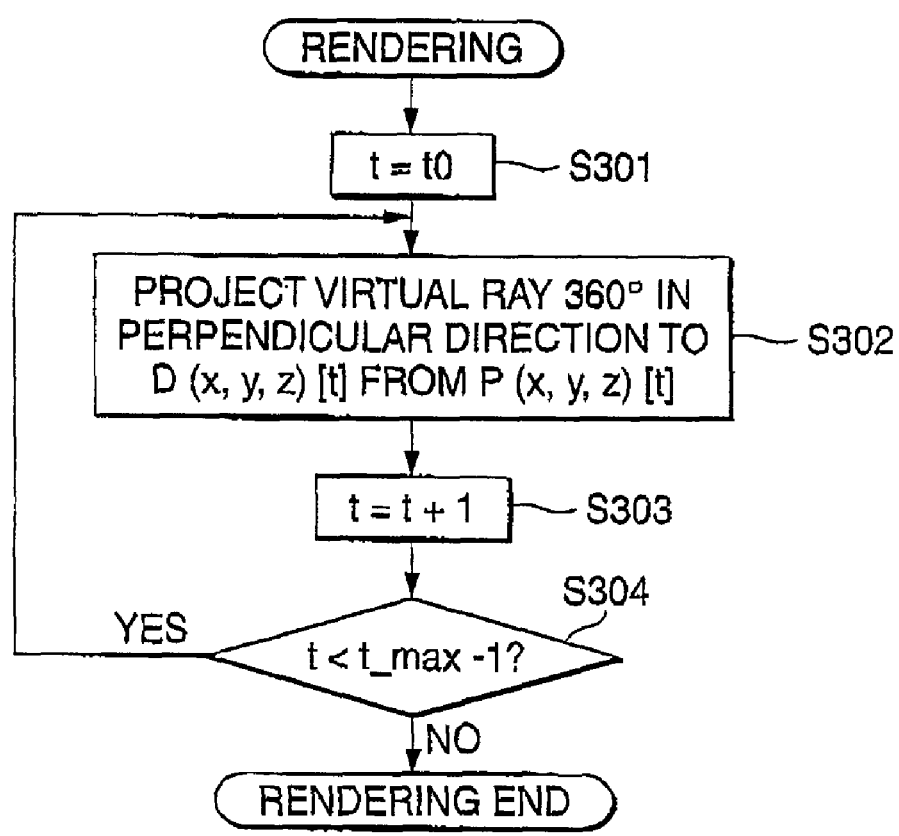
FIG. 14 is a flowchart of a rendering phase in the corrected cylindrical projection method of the first embodiment of the invention.

FIG. 14 is a flowchart of the rendering phase in the corrected cylindrical projection method of the embodiment. In the rendering phase, first t is set to t0 (step S301) and a virtual ray is projected 360° in the perpendicular direction to the normal vector D (x, y, z) [t] of the disk from P (x, y, z) [t] (step S302).

Next, t is incremented (step S303) and a comparison is made between t and t_max−1 (step S304). If t is smaller than t_max−1 (YES), the process returns to step S302; if t is equal to or greater than t_max−1 (NO), the rendering is completed.

Thus, according to the image processing method of the embodiment, the direction of the disk is changed so that the angle between the normal vectors of the adjacent disks lessens or that the virtual spring energy between the adjacent disks lessens. Accordingly, quiver of the virtual rays along the path lessens and effect of the scale on the image along the path can be prevented and in the portion where the path largely bends, duplicate display of the same observation object can also be prevented.

Second Embodiment

Figure 15:
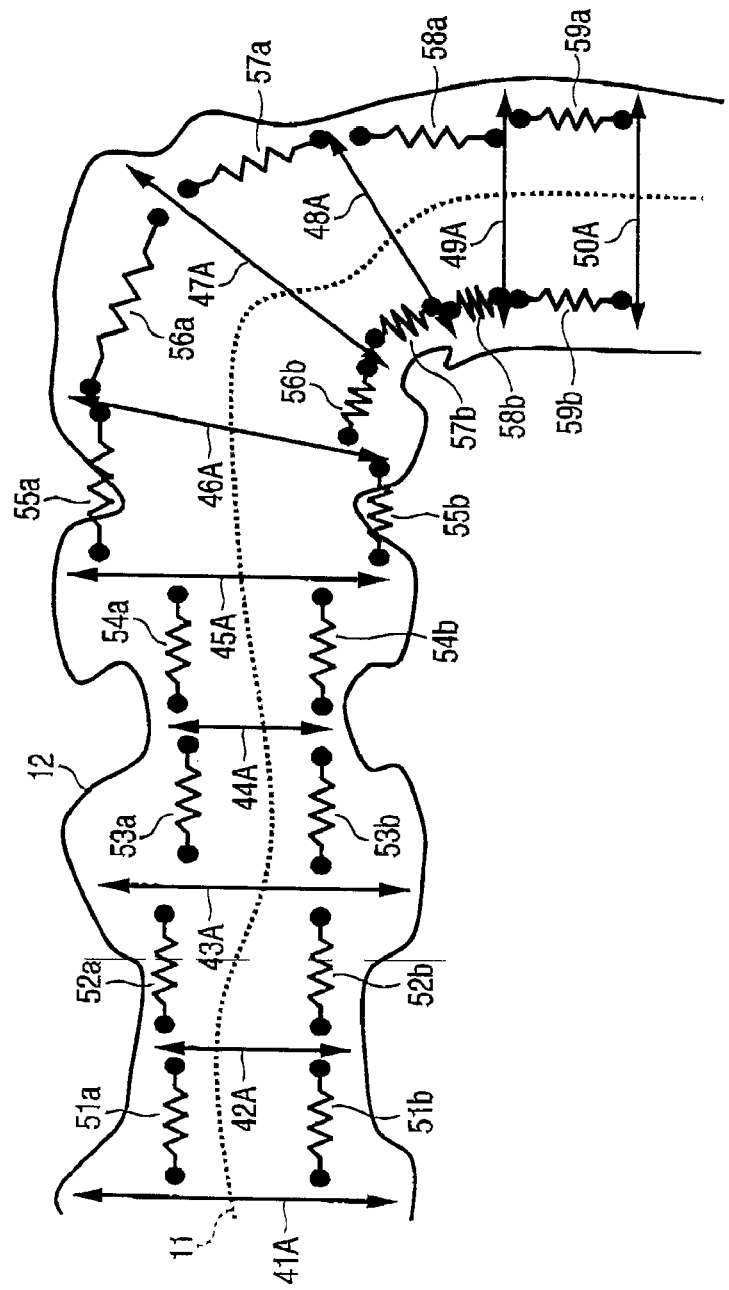
FIG. 15 is a drawing to describe an image processing method according to a second embodiment of the invention.

FIG. 15 is a drawing to describe an image processing method according to a second embodiment of the invention. In the embodiment, the radiuses of disks 41A to 50A are optimized in accordance with the radius of a large intestine 12. That is, the radiuses of the disks 41A to 50A are not made common according to the maximum radius (R) of the large intestine 12 and each of the disks 41A to 50A is set to a radius so as to completely contain the large intestine 12. In so doing, the disk can be bent at a larger angle in a narrow part of the large intestine 12, and more highly flexible bending is made possible.

Virtual springs 51a to 59b connecting the disks 41A to 50A are connected according to the contours of the disk having the smaller radius. The disk is moved so that virtual spring energy E becomes the minimum, and a virtual ray is projected along the disk.

Thus, the radiuses of the disks 41A to 50A are optimized for each place of the large intestine 12, the adjacent disks are connected by the virtual springs, and the directions of the disks are adjusted so that the virtual spring energy E becomes the minimum, whereby the adjacent disks are prevented from crossing each other.

Accordingly, quiver of the virtual rays along a central path 11 lessens and effect of the scale on the image along the central path 11 can be prevented and in the portion where the central path 11 largely bends, duplicate display of the same observation object can also be prevented.

Figure 16B:
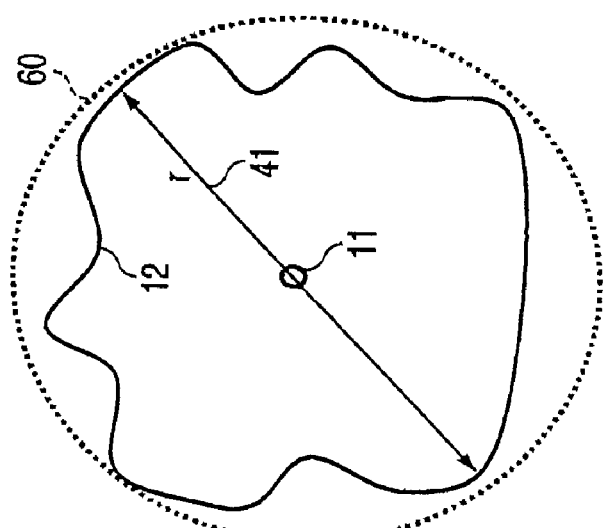
FIGS. 16A and 16B are drawings to describe a disk radius determination method and a virtual spring connection method in a second embodiment of the invention.
Figure 16A:
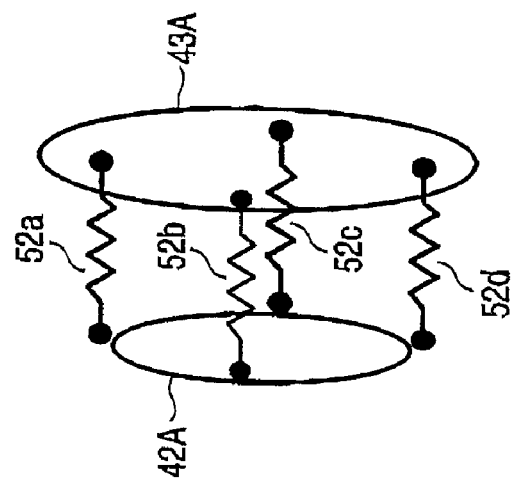

FIGS. 16A and 16B are drawings to describe a disk radius determination method and a virtual spring connection method in the embodiment. As shown in FIG. 16A, a radius r of a disk 60 is set so as to completely contain the large intestine 12 with the central path 11 as the center for each cross section of the large intestine 12. As shown in FIG. 16B, virtual springs 52a to 52d are connected according to the contours of the disk 42A having the smaller radius between the adjacent disks 42A and 43A. The contours can be acquired by performing existing two-dimensional region extraction (segmentation) processing of floodfill, etc., on the image of the cross section.

Figure 17:
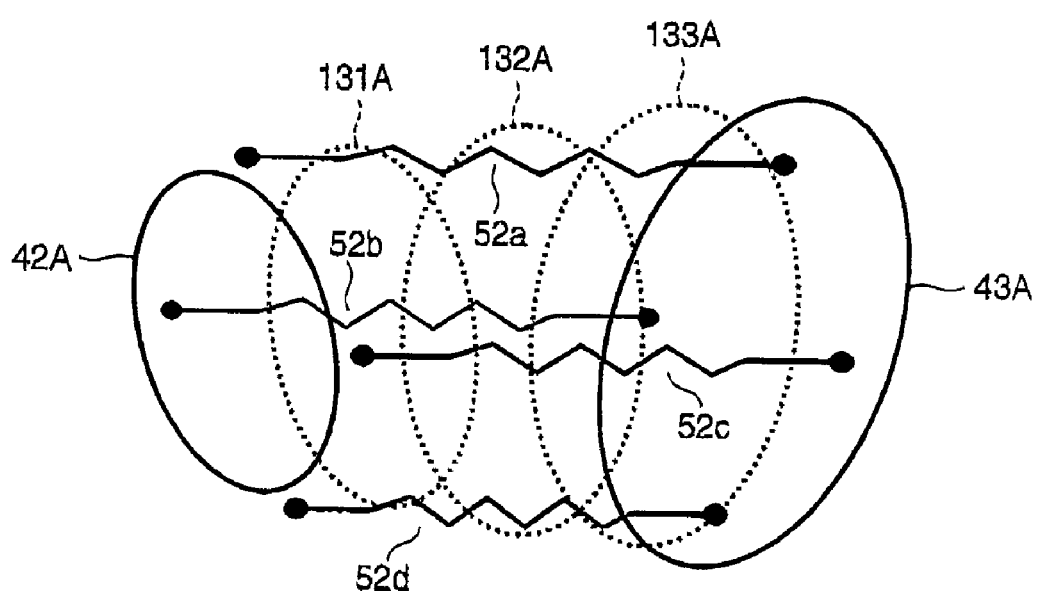
FIG. 17 is a schematic representation for interpolating between adjacent disks.

FIG. 17 is a schematic representation of the embodiment using interpolation between adjacent disks. Although the disks created in the large intestine are adjusted so that the virtual spring energy E becomes the minimum so as to prevent the adjacent disks from crossing each other, the disks are placed only at a sparse interval. Between the adjacent disks, planes 131A, 132A, 133A, along which virtual rays are projected are assumed, the normal vector of which are obtained by interpolating between the normal vectors of the adjacent disks. Accordingly, the number of the calculation is lessened, so that the calculation will be more numerically stable and the processing time can be shortened.

Also in the embodiment, an image is created according to the initialization phase (step S100), the calculation phase (step S200), and the rendering phase (step S300) shown in FIG. 6. The initialization phase (step S100) and the rendering phase (step S300) are similar to those in the first embodiment and are shown in FIGS. 7, 8, and 14.

Figure 18:
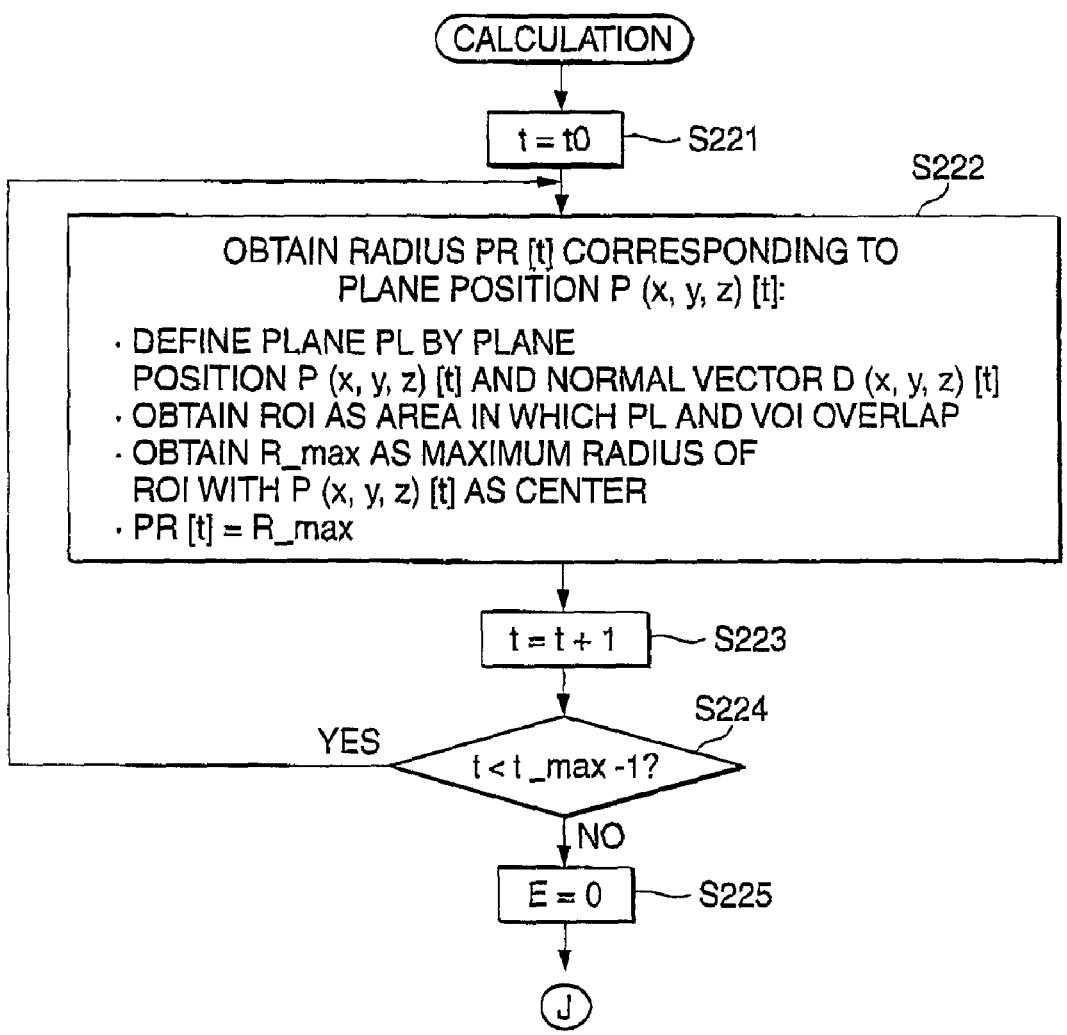
FIG. 18 is a flowchart (No. 1) of a calculation phase in a corrected cylindrical projection method of a second embodiment of the invention.
Figure 19:
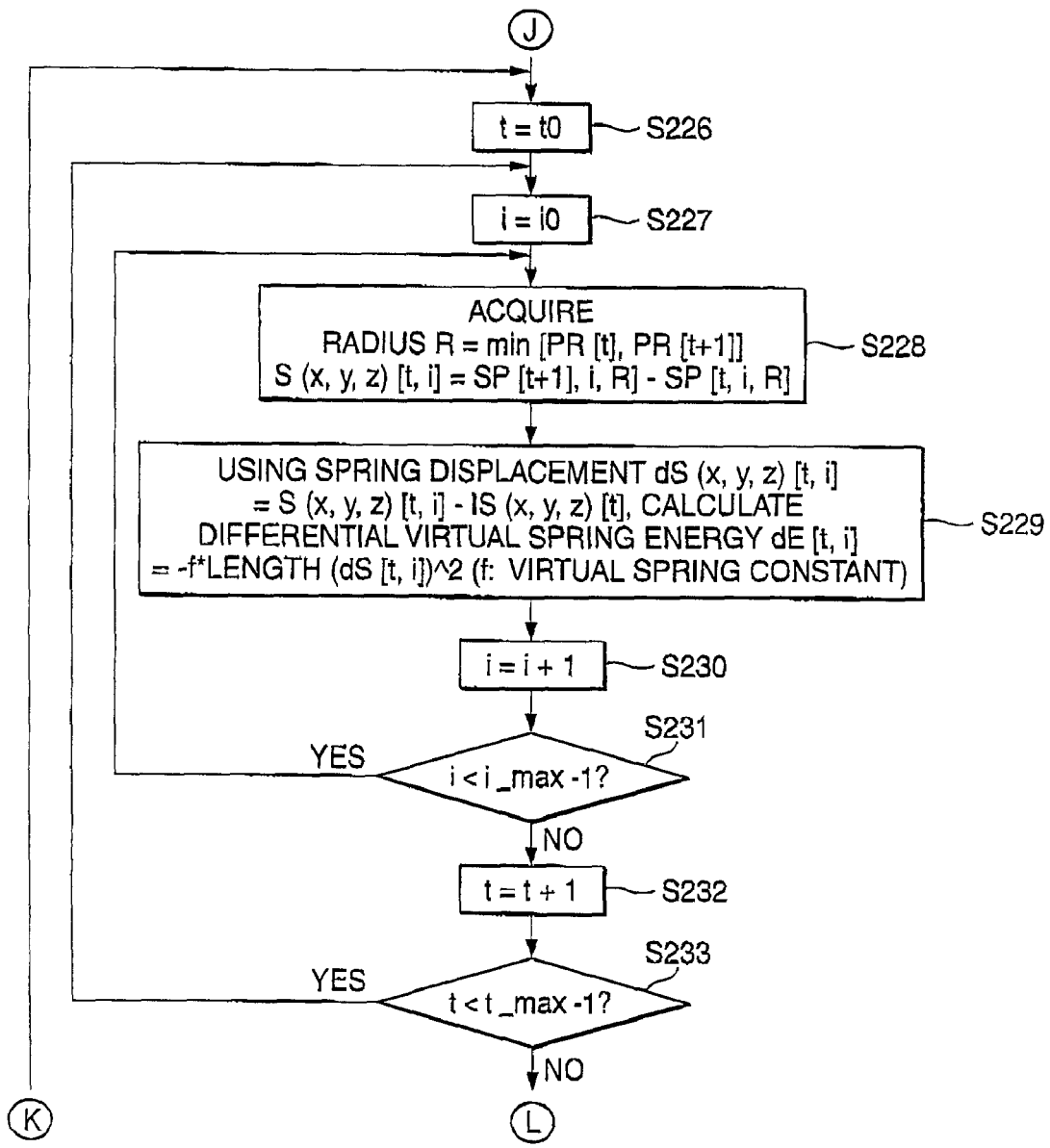
FIG. 19 is a flowchart (No. 2) of the calculation phase in the corrected cylindrical projection method of a second embodiment of the invention.
Figure 20:
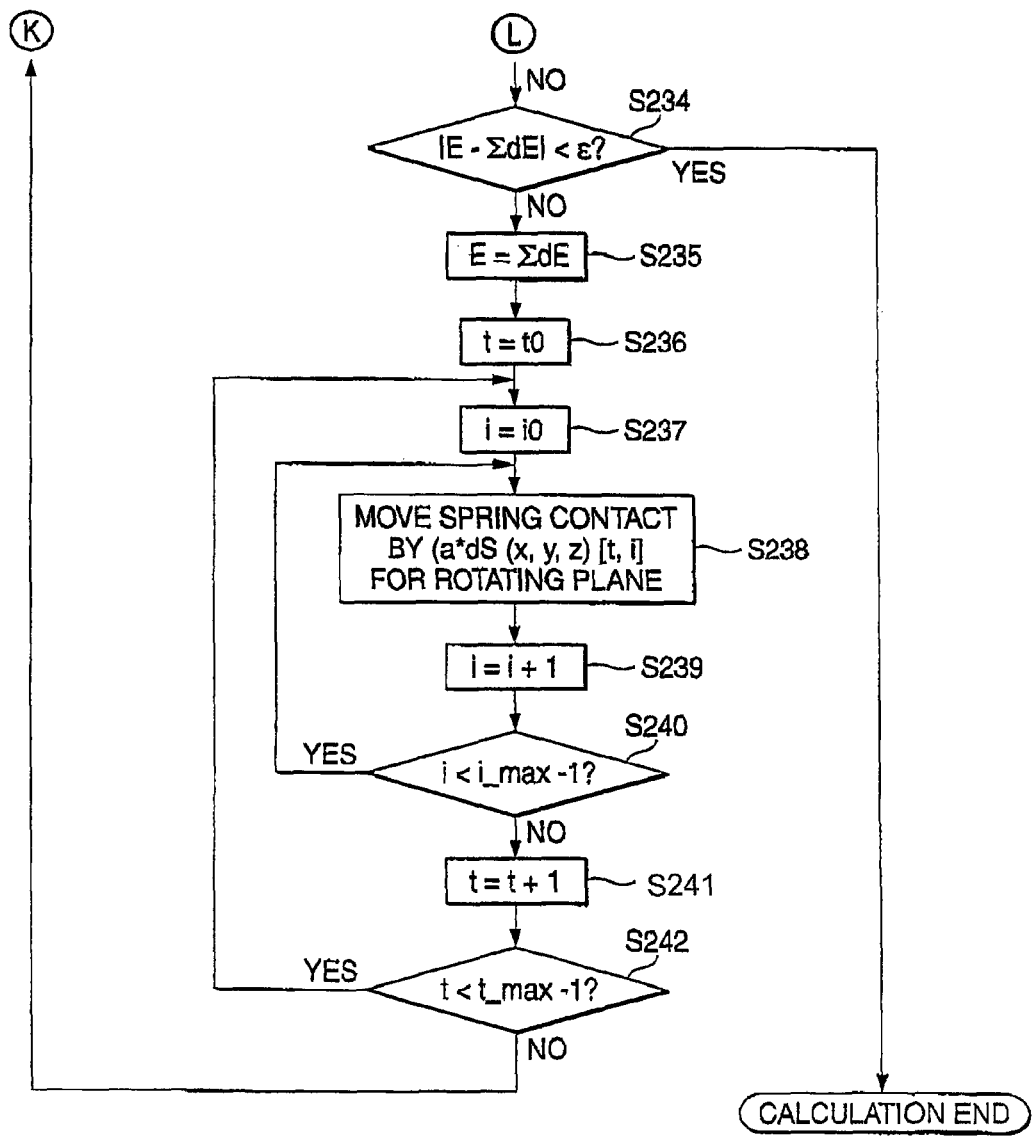
FIG. 20 is a flowchart (No. 3) of the calculation phase in the corrected cylindrical projection method of a second embodiment of the invention.

FIGS. 18, 19, and 20 show the calculation phase of the second embodiment. In the calculation phase of the embodiment, first, t is set to t0 (step S221) and a radius PR [t] corresponding to a plane reference position P (x, y, z) [t] (FIG. 16, 11) is obtained. That is, a plane PL is defined by the plane reference position P (x, y, z) [t] and normal vector D (x, y, z) [t], ROI is obtained as an area in which PL and VOI overlap, R_max is obtained as the maximum radius of ROI with P (x, y, z) [t] as the center (FIG. 16, 41), and PR [t]=R_max (step S222).

Next, t is incremented (step S223) and a comparison is made between t and t_max−1 (step S224). If t is smaller than t_max−1 (YES), the process returns to step S222; if t is equal to or greater than t_max−1 (NO), E is set to 0 (step S225), t is set to t0 (step S226), and i is set to i0 (step S227).

Next, radius R=min [PR [t], PR [t+1], S (x, y, z) [t, i]=SP [t+1], i, R]−SP [t, i, R] is acquired (step S228) and using spring displacement dS (x, y, z) [t, i]=S (x, y, z) [t, i]−IS (x, y, z) [t], differential virtual spring energy dE [t, i]=−f*length (dS [t, i])^2 (^2 represents a square) is calculated (f: Virtual spring constant) (step S229).

Next, i is incremented (step S230) and a comparison is made between i and i_max−1 (step S231). If i is smaller than i_max−1 (YES), the process returns to step S228; if i is equal to or greater than i_max−1 (NO), one is added to t (step 5232). A comparison is made between t and t_max−1 (step S233) If t is smaller than t_max−1 (YES), the process returns to step S227; if t is equal to or greater than t_max−1 (NO), a comparison is made between |E−ΣdE| and ϵ (step S234). If |E−ΣdE| is smaller than ϵ (YES), it is assumed that the calculation sufficiently converges, and the calculation is completed.

On the other hand, if |E−ΣdE| is equal to or greater than ϵ (NO), E=ΣdE (step S235), t is set to t0 (step S236), i is set to i0 (step S237), and the spring contact is moved by (a*dS (x, y, z) [t, i] for rotating the plane (a: Displacement amount coefficient per iteration) (step S238)

Next, i is incremented (step S239) and a comparison is made between i and i_max−1 (step S240). If i is smaller than i_max−1 (YES), the process returns to step S238; if i is equal to or greater than i_max−1 (NO), t is incremented (step S241) A comparison is made between t and t_max−1 (step S242). If t is smaller than t_max−1 (YES), the process returns to step S237; if t is equal to or greater than t_max−1 (NO), the process returns to step S226.

Thus, according to the image processing method of the embodiment, the direction of the plane is changed so that the angle between the normal vectors of the adjacent planes lessens or that the virtual spring energy between the adjacent planes lessens. Accordingly, quiver of the virtual rays along the path lessens and effect of the scale on the image along the path can be prevented and in the portion where the path largely bends, duplicate display of the same observation object can also be prevented. Particularly, with an actual tubular tissue, when the tubular tissue largely bends, the tubular tissue becomes flat as when a rubber hose bends. In the embodiment, a larger bend can be allowed in the short radius direction of the flat two-dimensional region, so that more highly flexible bending is made possible.

Third Embodiment

Figure 21:
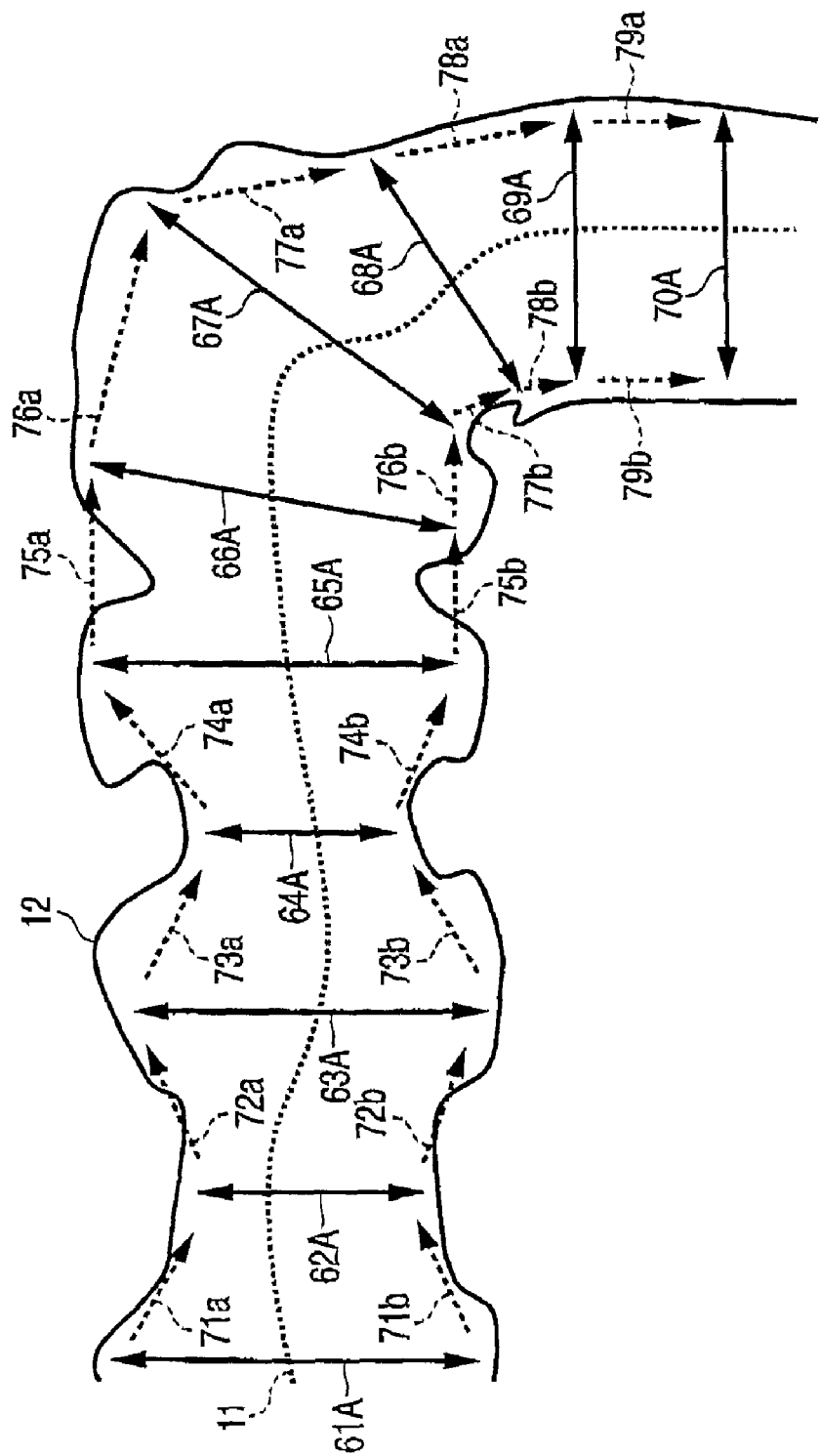
FIG. 21 is a drawing to describe an image processing method according to a third embodiment of the invention.

FIG. 21 is a drawing to describe an image processing method according to a third embodiment of the invention. In the embodiment, the radius of a large intestine 12 is obtained for each position of a central path 11 and for each projection direction of a virtual ray. That is, virtual rays are projected according to the contours of cross sections 61A to 70A of the large intestine 12. Vectors 71a to 79b connecting boundaries of the cross sections 61A to 70A of the large intestine 12 are used rather than the virtual spring model, whereby calculation is simplified. In so doing, in a narrow part of the large intestine 12, if the cross sections 61A to 70A are bent at a larger angle, the adjacent cross sections do not cross each other.

Figure 22B:
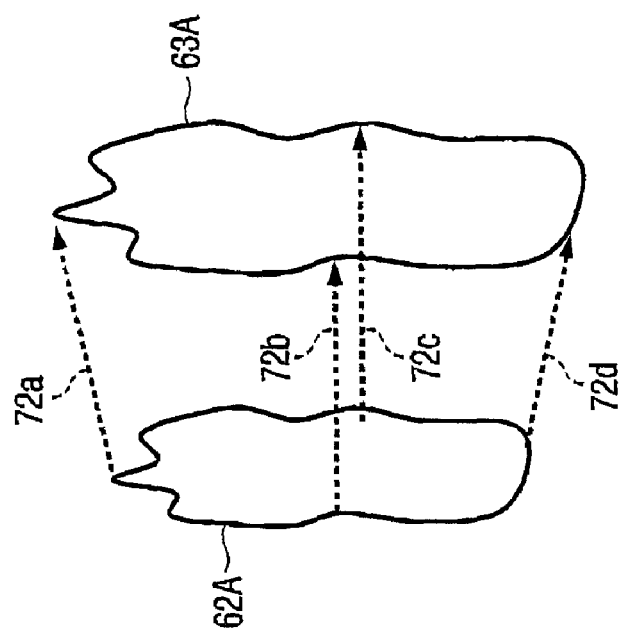
FIGS. 22A and 22B are drawings to describe how to obtain cross sections 61A to 70A of a large intestine 12 and vectors 71a to 79b connecting boundaries of the cross sections in a third embodiment of the invention.
Figure 22A:
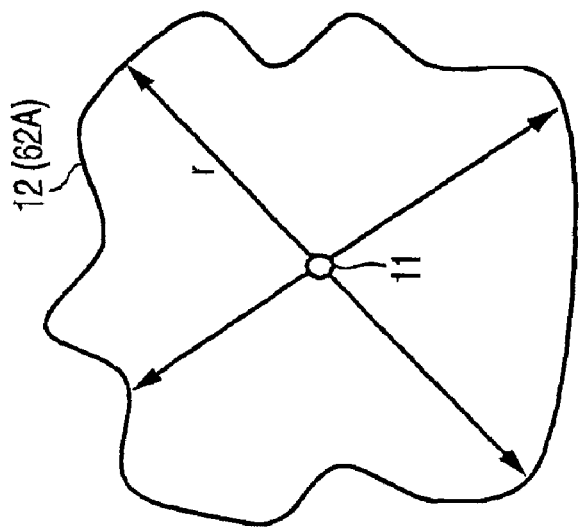

FIGS. 22A and 22B are drawings to describe how to obtain the cross sections 61A to 70A of the large intestine 12 and the vectors 71a to 79b connecting the boundaries of the cross sections in the embodiment. As shown in FIG. 22A, the cross section 62A of the large intestine 12 is a plane bordered by the contours of the large intestine 12 for each position of the central path 11. As shown in FIG. 22B, the vectors 72a to 72d connecting the cross sections 62A and 63A of the large intestine 12 are set.

In the embodiment, to prevent the adjacent cross sections from crossing each other, the cross section is rotated so that the inner product of the direction vector of the central path 11 of the large intestine 12 and the vector connecting the boundaries of the cross sections becomes positive, rather than using the virtual spring model. Accordingly, the direction vector of the central path 11 of the large intestine 12 and the vector connecting the boundaries can be prevented from being in opposite directions, and calculation to obtain a condition that the adjacent cross sections do not cross each other can be simplified.

Also in the embodiment, an image is created according to the initialization phase (step S100), the calculation phase (step S200), and the rendering phase (step S300) shown in FIG. 6. The initialization phase (step S100) and the rendering phase (step S300) are similar to those in the first embodiment and are shown in FIGS. 7, 8, and 14.

Figure 23:
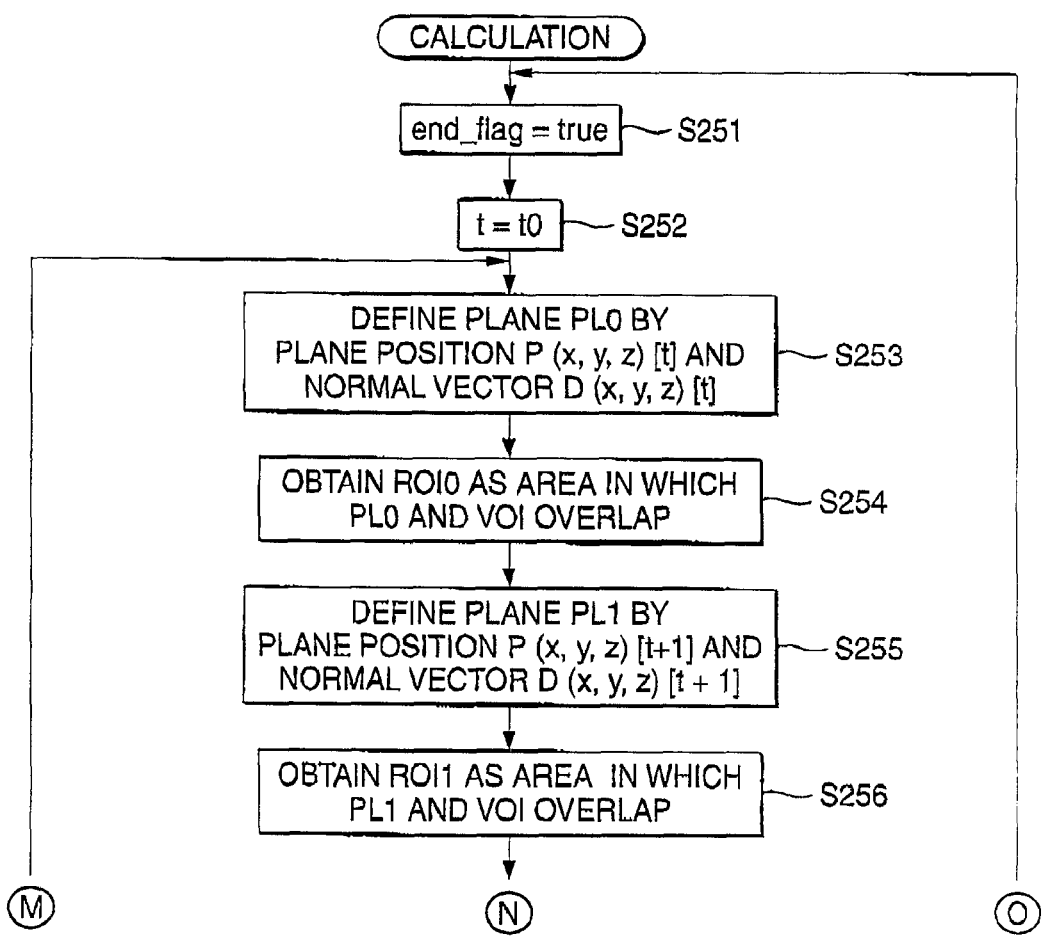
FIG. 23 is a flowchart (No. 1) of a calculation phase in a corrected cylindrical projection method of a third embodiment of the invention.
Figure 24:
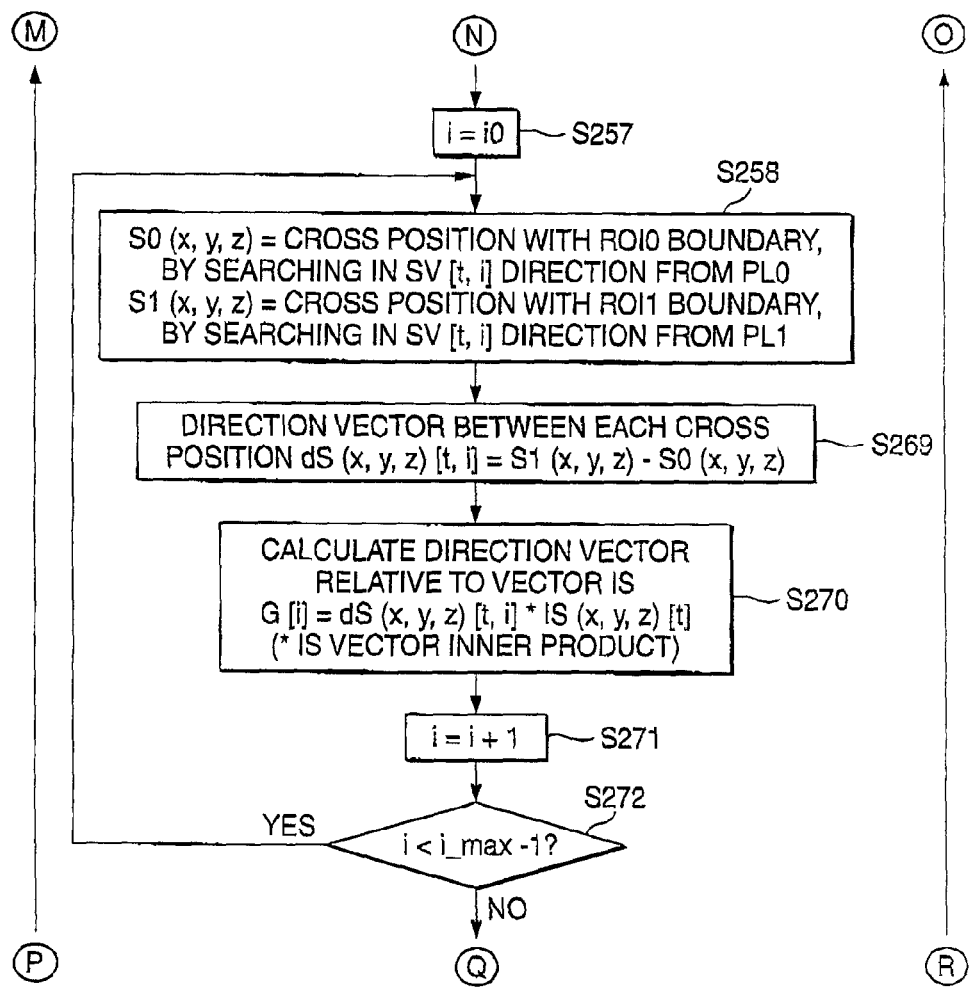
FIG. 24 is a flowchart (No. 2) of the calculation phase in the corrected cylindrical projection method of a third embodiment of the invention.
Figure 25:
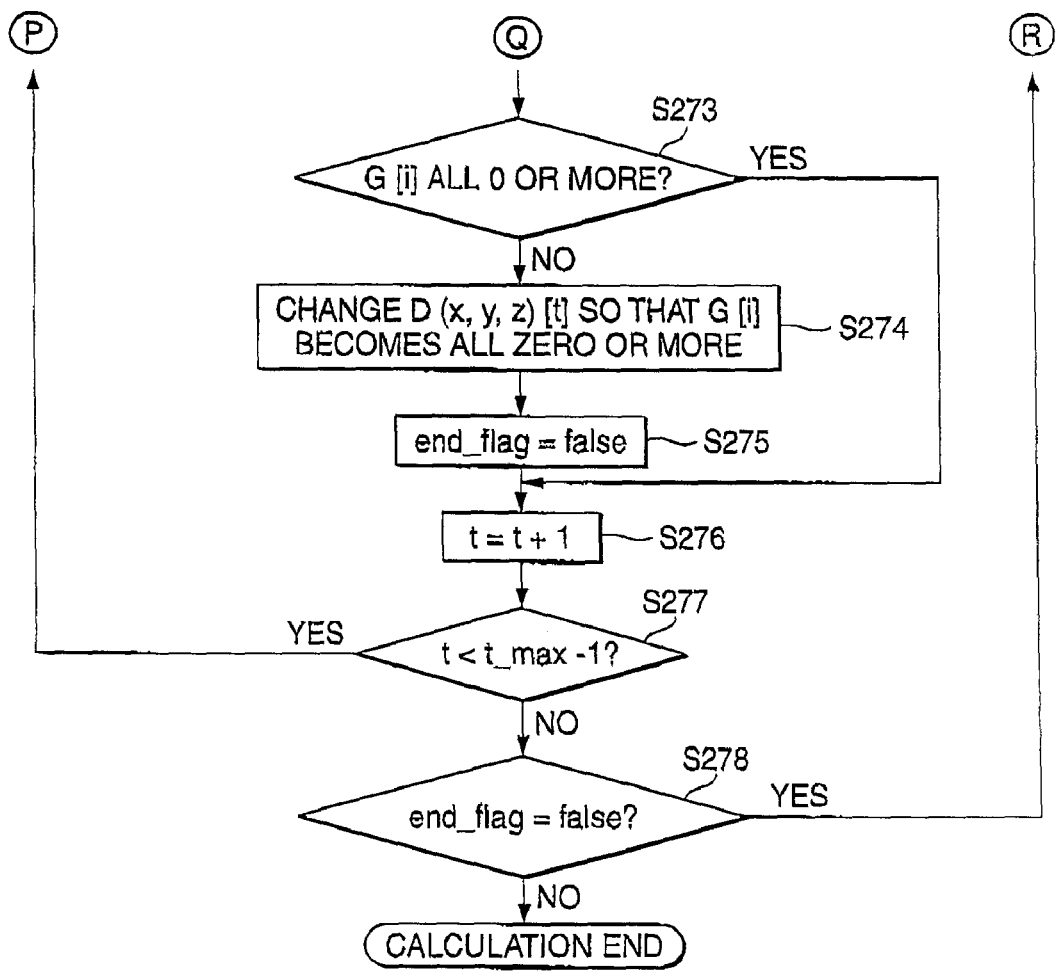
FIG. 25 is a flowchart (No. 3) of the calculation phase in the corrected cylindrical projection method of a third embodiment of the invention.
Figure 28A:
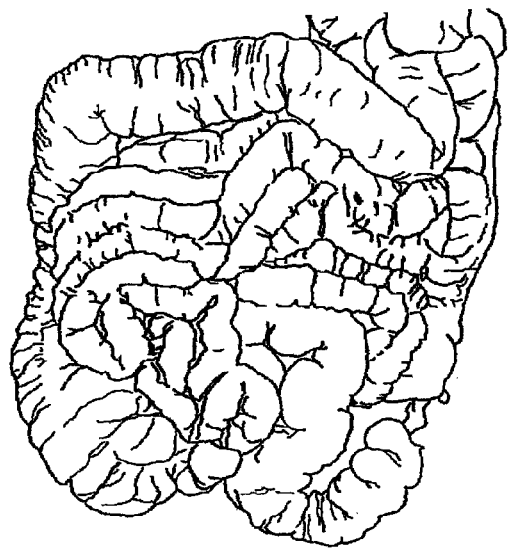
FIG. 28A shows an example of displaying a large intestine according to a parallel projection method of volume rendering.
Figure 28B:
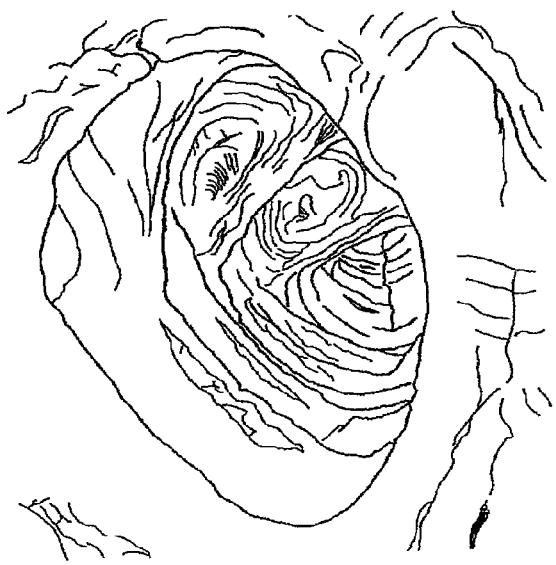
FIG. 28B shows an example of configuring a virtual endoscope.
Figure 29A:
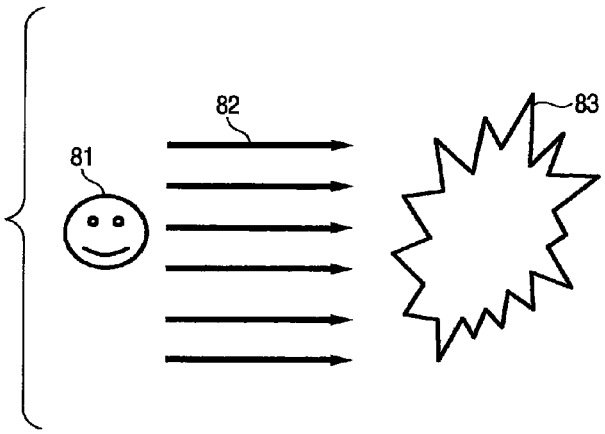
FIGS. 29A and 29B are drawings to describe a parallel projection method and a perspective projection method.
Figure 29B:
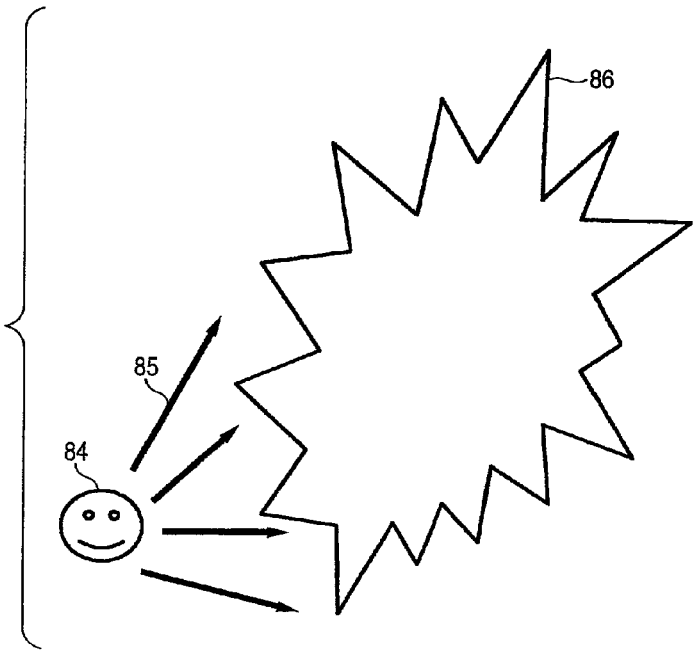
Figure 31A:
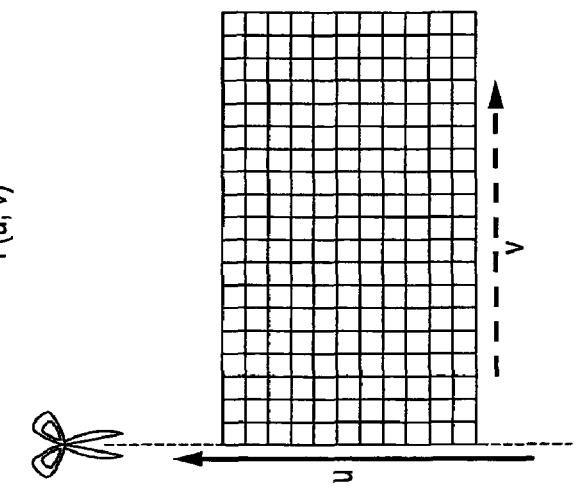
FIGS. 31A to 31E are schematic representations of a cylindrical projection method using the cylindrical coordinate system.
Figure 31B:
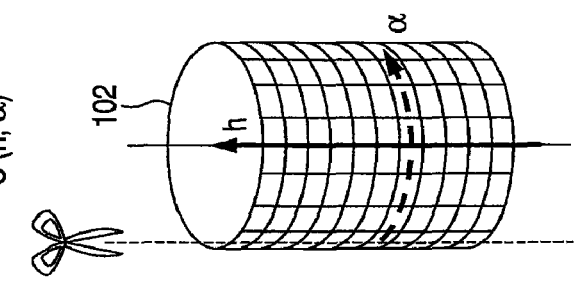
Figure 31C:
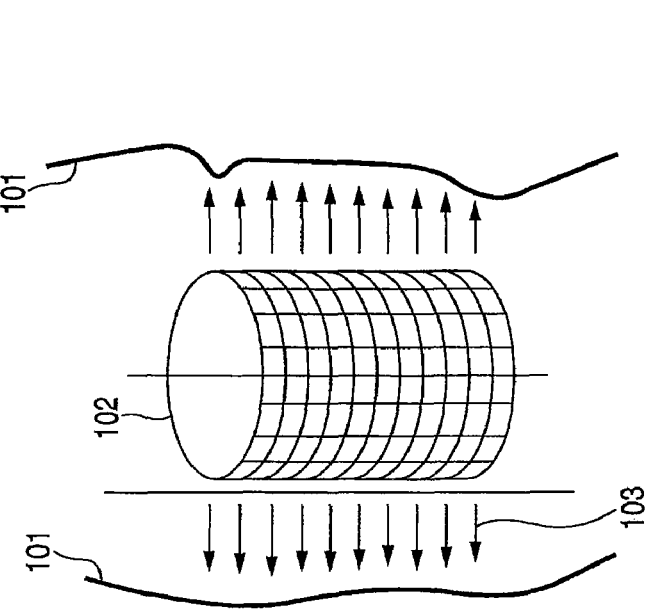
Figure 31E:
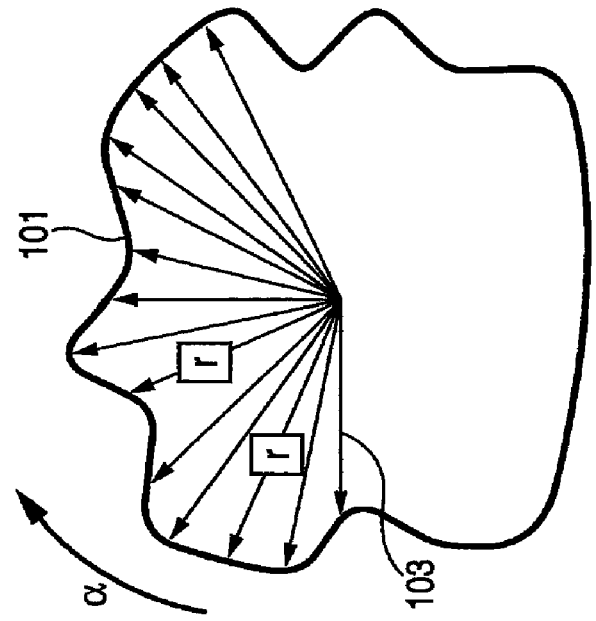
Figure 31D:
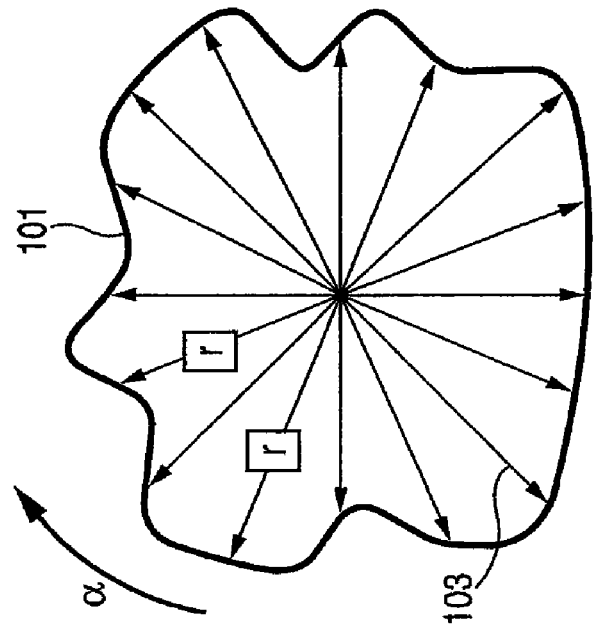
Figure 32A:
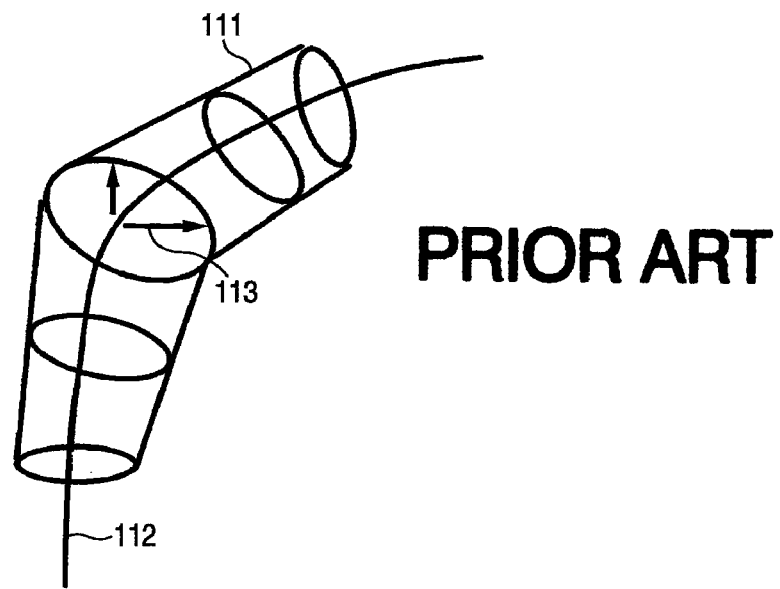
FIGS. 32A and 32B are drawings to describe a curved cylindrical projection method when the tubular tissue of an observation object is bent.
Figure 32B:
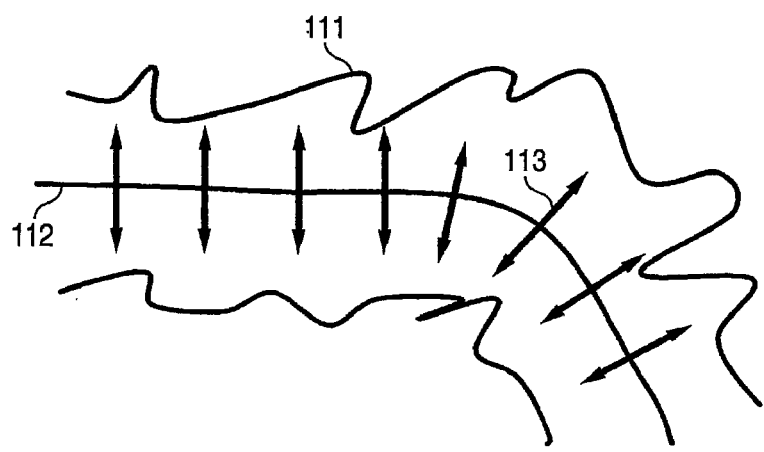
Figure 33:
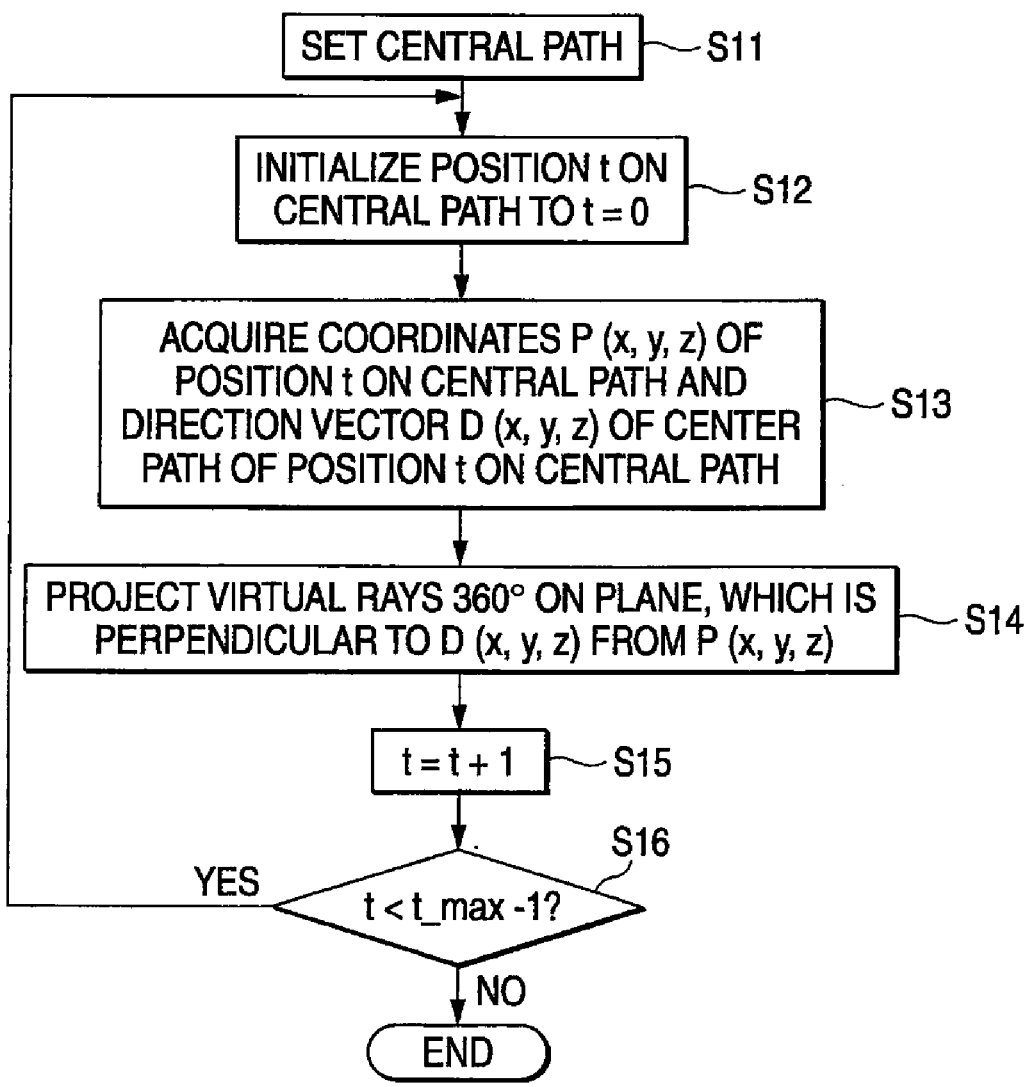
FIG. 33 is a flowchart of a curved cylindrical projection method in a related art.
Figure 34:
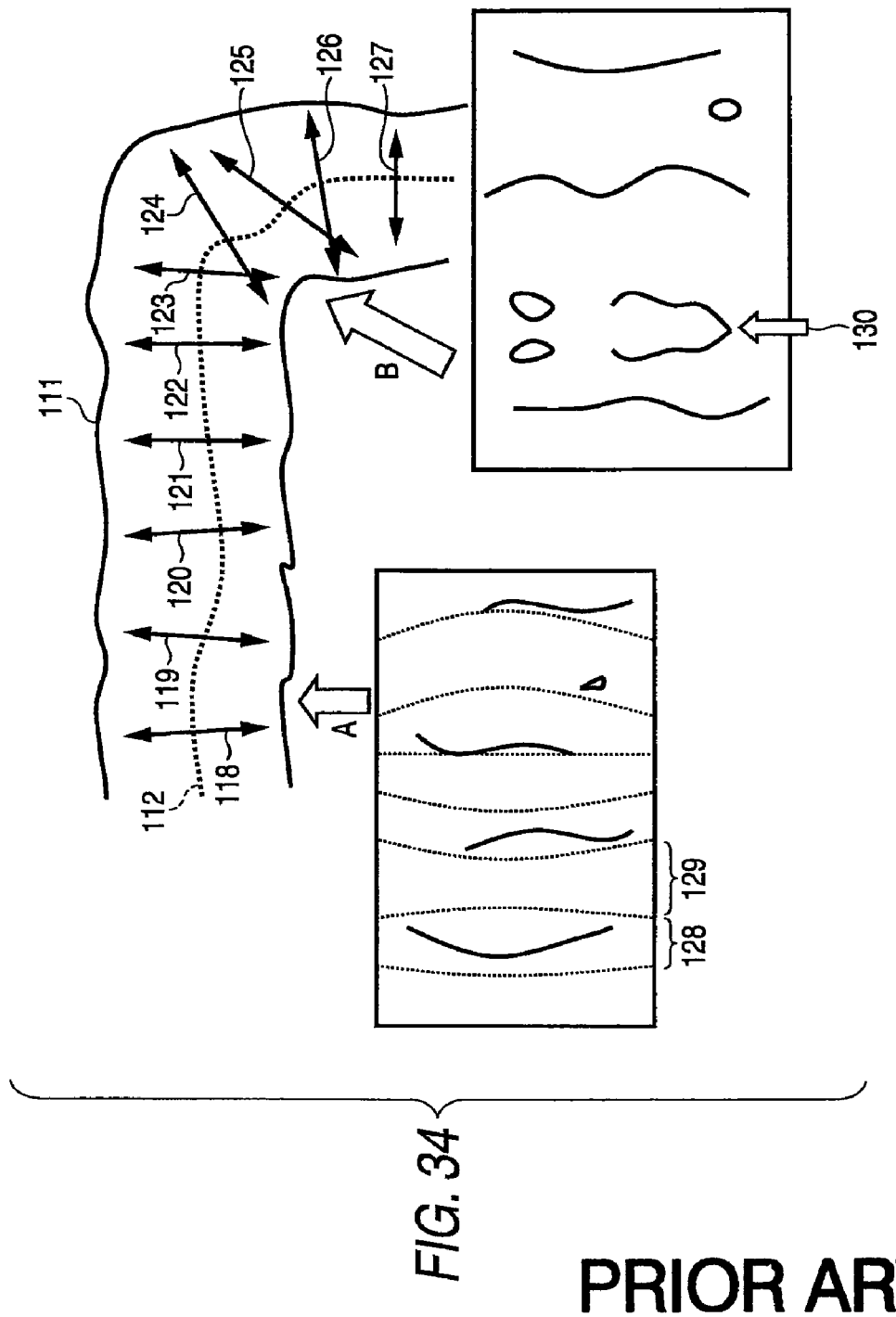
FIG. 34 is a drawing to describe a problem of the curved cylindrical projection method in the related art.

FIGS. 23, 24, and 25 show the calculation phase of the third embodiment. In the calculation phase of the embodiment, first, end_flag is set to true (step S251), t is set to t0 (step S252), and a plane PL0 is defined by a plane reference position P (x, y, z) [t] and normal vector D (x, y, z) [t] (step S253).

Next, ROI0 is obtained as an area (cross section) in which PL0 and VOI overlap (step S254). Likewise, a plane PLI is defined by a plane reference position P (x, y, z) [t+1] and normal vector D (x, y, z) [t+1] (step S255), and ROI1 is obtained as an area in which PL1 and VOI overlap (step S256). Then, i is set to i0 (step S257), a search is made in SV [t, i] direction from PL0 to obtain the cross position S0 (x, y, z) with the ROI0 boundary and SV, and a search is made in SV [t, i] direction from PL1 to obtain the cross position S1 (x, y, z) with the ROI1 boundary (step S258). Where, SV is a direction perpendicular to the central path. Argument i stands for indexed angle (0–i_max) around center path.

Next, direction vector between each cross position is obtained as dS (x, y, z) [t, i]=S1 (x, y, z)–S0 (x, y, z) (step S269). The direction of the direction vector relative to a vector IS(x, y, z) [t] is calculated as G [i]=dS (x, y, z) [t, i]*IS (x, y, z) [t] (* is vector inner product) (step S270), where IS represents direction vector of the central path P(x, y, z) [t]–P(x, y, z) [t+1].

Next, i is incremented (step S271) and a comparison is made between i and i_max–1 (step S272). If i is smaller than i_max–1 (YES), the process returns to step S258; if i is equal to or greater than i_max–1 (NO), whether or not G [i] is all zero or more is determined (step S273). If G [i] is all zero or more (YES), the adjacent cross sections do not cross each other and thus the process goes to step S276.

On the other hand, if G [i] is not all zero or more (NO), the adjacent cross sections cross each other and thus D (x, y, z) [t] is changed so that G [i] becomes all zero or more, This is accomplished by giving two degrees of freedom to each cross section and moving the cross section with the plane reference position P as a fixed point (step S274: See FIGS. 26A-26C and FIGS. 27A-27B). Then, end flag is set to false (step S275), and t is incremented (step S276).

Next, a comparison is made between t and t_max–1 (step S277). If t is smaller than t_max–1 (YES), the process returns to step S253; if t is equal to or greater than t_max–1 (NO), it is determined if end flag is false (step S278). If end_flag is false (YES), the process returns to step S251; if end_flag is not false (NO), the calculation is completed.

Thus, according to the image processing method of the embodiment, the cross section is rotated so that the inner product of the direction vector of the central path 11 of the large intestine 12 and the vector connecting boundaries of adjacent cross sections becomes positive. Accordingly, the direction vector of the central path 11 of the large intestine 12 and the vector connecting the boundaries can be prevented from being in opposite directions, and the calculation to obtain the condition that the adjacent cross sections do not cross each other can be simplified.

In the image processing method of the embodiments described above, the projection image can also be calculated by surface rendering. The surface rendering is a method of composing surface data using elements having a surface of a polygon, etc., as units and visualizing a three-dimensional object, and is the same as the volume rendering in creating an image using virtual rays. To create surface data from volume data, for example, an appropriate threshold value is set, a volumetric region is extracted, and the region boundary face is obtained. Further, the invention can also be applied to MIP (maximum intensity projection) method, MiNIP (minimum intensity projection) method, Raysum method, and Average method in addition to the ray casting method and can also be applied to ray tracing in addition to the volume rendering.

The calculation processing to generate a projection image can be performed by a GPU (Graphic Processing Unit) The GPU is an arithmetic processing unit specialized for image processing as compared with a general-purpose CPU, and usually is installed in a computer separately from a CPU.

In the image processing method of the embodiments, the volume rendering calculation can be divided in predetermined angle units, image regions, volume regions, etc., and can be later superposed, so that the image processing method can be executed in parallel processing, network distributed processing, a dedicated processor, or a combination thereof.

In the image processing method of the embodiments, the region of the organ to be observed is set to a region where the virtual rays do not cross each other for performing image processing, but the region where the virtual rays do not cross each other may be an expanded region of the region of the organ to be observed. In so doing, the angle between the adjacent planes onto which the virtual rays are projected becomes smaller and the stable result can be provided.

The embodiments of the invention can be also achieved by a computer readable medium in which a program code (an executable program, an intermediate code program, and a source program) according to the above described image processing method is store so that a computer can read it, and by allowing the computer (or a CPU or an MCU) to read out the program (software) stored in the storage medium and to execute it.

The computer readable medium includes, for example, a tape-type medium, such as a magnetic tape or a cassette tape, a disc-type medium including a magnetic disc, such as a floppy (a registered trademark) disc or a hard disc, and an optical disc, such as CD-ROM/MO/MD/DVD/CD-R, a card-type medium, such as an IC card (including a memory card) or an optical card, and a semiconductor memory, such as a mask ROM, an EPROM, an EEPROM, or a flash ROM.

Further, the computer may be constituted such that it can be connected to a communication network, and the program may be supplied thereto through the communication network. The communication network includes, for example, the Internet, the Intranet, an intranet, an extranet, a LAN, an ISDN, a VAN, a CATV communication network, a virtual private network, telephone lines, a mobile communication network, and a satellite communication network. A transmission medium for constituting the communication network includes, for example, wire lines, such as IEEE1394, USB, power lines, cable TV lines, telephone lines, and ADSL lines, infrared rays, such as IrDA or a remote controller, and wireless lines, such as Bluetooth (a registered trademark), 802.11 Wireless, HDR, a mobile communication network, satellite lines, and a terrestrial digital broadcasting network. In addition, the program may be incorporated into carrier waves and then transmitted in the form of computer data signals.

According to the invention, to project a virtual ray from a point along the path, the direction of each plane along which the virtual ray lies is changed so that the planes do not cross each other in the determined region, and thus without increasing the calculation load, duplicate display of the same observation object is not produced even in the portion where the path largely bends, and the lesion part can be grasped precisely.

The direction of the plane is changed so that the angle between the normal vectors of the adjacent planes lessens or that the virtual spring energy between the adjacent planes lessens. Accordingly, quivering of the virtual rays along the path lessens and effect of the scale on the image along the path can be prevented and in the portion where the path largely bends, duplicate display of the same observation object can also be prevented.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An image processing method for visualizing information of an observation object, the image processing method comprising:
    setting a path which is a center line of the observation object;
    determining a region that includes the information to be visualized;
    setting a plurality of planes crossing the path, each of said planes does not cross each other in the region, wherein at least one of the planes forms an acute angle or an obtuse angle with the path; and
    projecting virtual rays onto the observation object from points on the path so as to visualize the information near the path, thereby to generate a single projected image, wherein each of the virtual rays are projected while rotating from the points on the path and projected along the planes crossing the path.

2. The image processing method as claimed in claim 1, where in the region is a region within a predetermined distance from the path.

3. The image processing method as claimed in claim 1, wherein said region is a region of a tubular tissue as the observation object.

4. The image processing method as claimed in claim 1, comprising:
    obtaining a normal vector of each of the planes,
    wherein the direction of each of the planes is changed so that an angle between the normal vectors of the adjacent planes becomes small.

5. The image processing method as claimed in claim 1, comprising:
    setting a virtual spring that connects the adjacent planes,
    wherein the direction of each of the planes is changed so that energy of the virtual spring becomes small.

6. The image processing method as claimed in claim 1, comprising:
    generating the single projected image by volume rendering by the projected virtual rays.

7. The image processing method as claimed in claim 1, comprising:
    generating the single projected image by surface rendering by the projected virtual rays.

8. The image processing method as claimed in claim 1, comprising:
    generating the single projected image by network distributed processing by the projected virtual rays.

9. The image processing method as claimed in claim 1, comprising:
    generating the single projected image using a GPU (Graphic Processing Unit) by the projected virtual rays.

10. The image processing method as claimed in claim 1, comprising:
    generating a medical image by the virtual rays being projected onto a tubular tissue in a human body.

11. A non-transitory computer readable medium having a program including instructions for permitting a computer to perform image processing for visualizing information of an observation object, the instructions comprising:
    setting a path which is a center line of the observation object;
    determining a region that includes the information to be visualized;
    setting a plurality of planes crossing the path, each of said planes does not cross each other in the region, wherein at least one of the planes forms an acute angle or an obtuse angle with the path; and
    projecting virtual rays onto the observation object from points on the path so as to visualize the information near the path, thereby to generate a single projected image, wherein each of the virtual rays are projected while rotating from the points on the path and projected along the planes crossing the path.

* * * * *